(12) United States Patent
Takeyama et al.

(10) Patent No.: US 6,222,566 B1
(45) Date of Patent: Apr. 24, 2001

(54) IMAGE FORMATION APPARATUS AND METHOD THEREOF

(75) Inventors: Yoshinobu Takeyama; Nobuyuki Yanagawa, both of Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/453,489

(22) Filed: Dec. 3, 1999

(30) Foreign Application Priority Data

Dec. 4, 1998 (JP) .................................................. 10-346140
Feb. 26, 1999 (JP) .................................................. 11-051780
Nov. 4, 1999 (JP) .................................................. 11-314323

(51) Int. Cl.[7] .......................... B41J 2/385; G01D 15/06; G03G 15/01
(52) U.S. Cl. ........................................... 347/116; 399/301
(58) Field of Search .................................... 347/115, 116; 399/299, 301, 302

(56) References Cited

U.S. PATENT DOCUMENTS

| 4,403,851 | 9/1983 | Yanagawa . | |
|---|---|---|---|
| 4,912,491 | * 3/1990 | Hoshino et al. | 347/116 |
| 4,921,236 | 5/1990 | Saeki et al. . | |
| 5,160,946 | * 11/1992 | Hwang | 347/116 |
| 5,740,492 | * 4/1998 | Deki et al. | 399/301 X |
| 5,765,083 | * 6/1998 | Shinohara | 399/301 |
| 5,828,926 | * 10/1998 | Iwata et al. | 399/301 X |
| 5,915,074 | * 6/1999 | Shimazawa et al. . | |
| 6,064,411 | * 5/2000 | van Sas et al. | 347/115 |

FOREIGN PATENT DOCUMENTS

| 7-36249 | 2/1995 | (JP) . |
| 7-325455 | 12/1995 | (JP) . |
| 8-101554 | 4/1996 | (JP) . |

* cited by examiner

*Primary Examiner*—Sandra Brase
(74) *Attorney, Agent, or Firm*—Oblon, Spivak, McClelland, Maier & Neustadt, P.C.

(57) ABSTRACT

An image formation apparatus including first and second image formation sections each of which can form an image with at least two colors. A mark is provided on the intermediate transfer belt. This mark indicates a particular position on the belt. A belt mark sensor detects the mark on the belt. A timing instruction signal with which a timing of image formation is instructed to the first and second image formation sections is initialized each time the mark on the belt is detected.

11 Claims, 20 Drawing Sheets

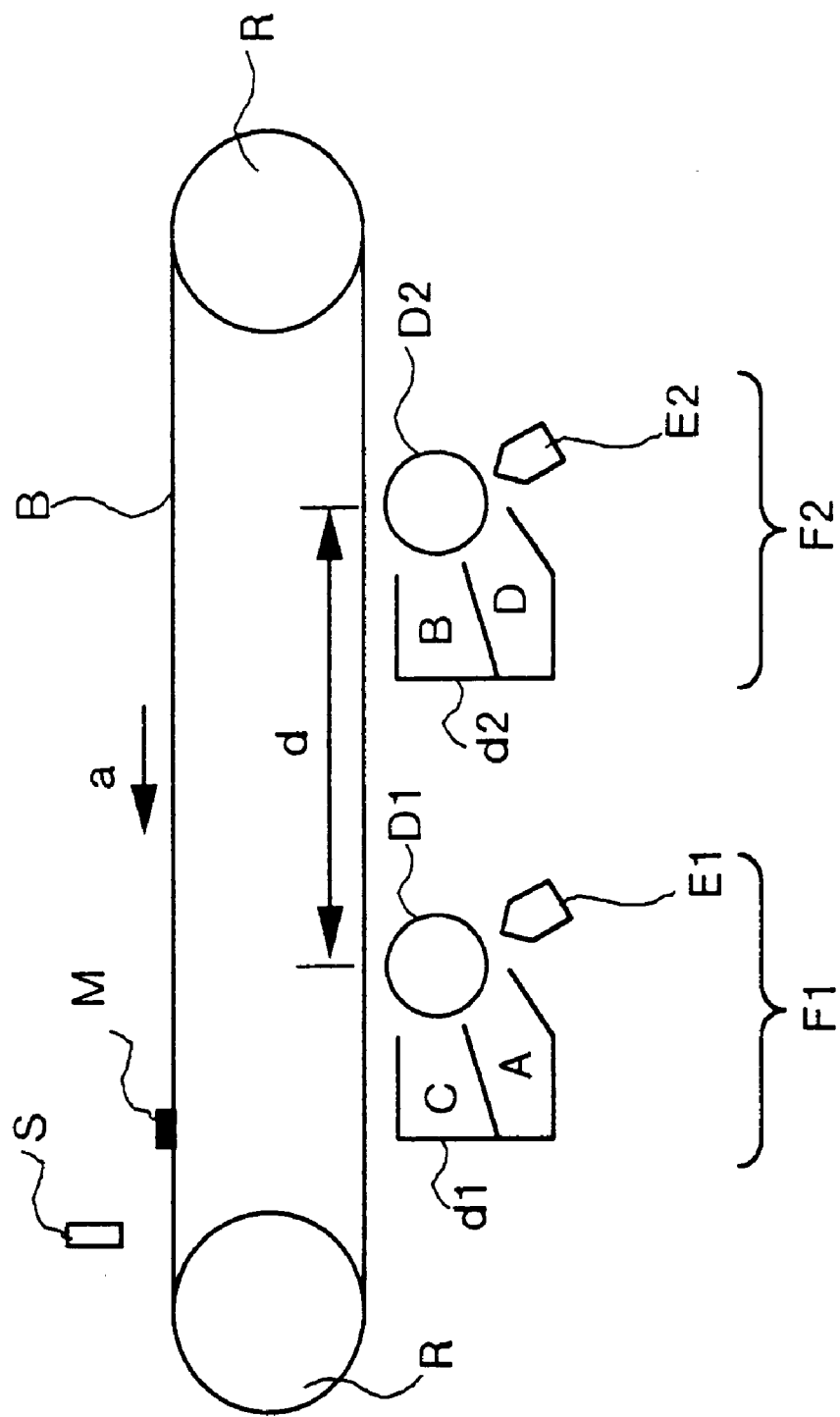

IMAGE FORMATION APPARATUS AND METHOD THEREOF

FIELD OF THE INVENTION

The present invention relates to an image formation apparatus and method thereof. More specifically this invention relates to an image formation apparatus having an intermediate transfer body.

BACKGROUND OF THE INVENTION

Some of the color printers as the image formation apparatuses capable of forming a color image are based on the intermediate transfer body system in which a toner image formed on a photosensitive body is at first transferred onto the intermediate transfer body and then is transferred to a paper or the like.

FIG. 20 is a view showing a configuration of a color printer having the intermediate transfer body. Intermediate transfer belt B, which is a belt-shaped intermediate transfer body, is used in this color printer. The configuration shown in this figure consists of the intermediate transfer belt B wound around two rollers R and moving in the direction a in the figure. Image formation sections F1 and F2 provided along the intermediate transfer belt B.

In the configuration described above, a marker M is provided on the surface of the intermediate transfer belt B. A belt mark sensor S, which detects the marker M, is provided above the intermediate transfer belt B. The marker M and belt mark sensor S are for monitoring one rotation of the intermediate transfer belt B.

On the other hand, the image formation sections F1, F2 are separated from each at a distanced, and have photosensitive drums D1, D2, exposure sections E1, E2 which write an electrostatic latent image on the photosensitive drums D1, D2, and development sections d1, d2 which develop the electrostatic latent image written thereon to a toner image respectively. The development section dl has toners with colors A and C, while the development section d2 has toners with colors B and D respectively.

In a color printer having the configuration as described above, the development sections d1 and d2 successively form toner images with colors A, B, C, and D respectively and then transfer the toner images onto the transfer belt B overlapping the images on each other. In this step, a toner image with each color is transferred based on a synchronizing signal generated within the color printer. When all of the images with each of the four colors are transferred, the toner image are transferred onto a paper all at once to form a color images with four colors.

The color printer as described above is so designed that the cycle of rotation of the intermediate transfer belt B is an integral multiple of a cycle of the synchronizing signal. The toner image is transferred onto the intermediate transfer belt B in response to a synchronizing signal generated at a constant cycle. Therefore, transfer of a toner image can always be started at a constant position on the intermediate transfer belt. With this configuration, the color printer shown in the figure can prevent a toner image for each color from displacing from a specified position on the intermediate transfer belt, and also can prevent color displacement in the formed image.

In reality, however, sometimes there occurs inhomogenous rotation due to degradation of the intermediate transfer belt B associated with passage of time or due to decentering of a roller R. When inhomogeneous rotation of a roller R occurs, the cycle of rotation of the intermediate transfer belt B varies each time the intermediate transfer belt rotates. Because of this phenomenon, in a color printer in which rotation of the intermediate transfer belt B is asynchronous to operations of the image formation sections F1, F2, even if the image formation sections F1 and F2 transfer a toner image based on a synchronizing signal generated at a constant cycle to the intermediate transfer belt B, a position for starting transfer varies each time image transfer is executed.

The displacement of a position for starting image transfer as described above causes color displacement among toner images with the colors A, B, C, and D, which may in turn cause degradation of quality of an image formed with the color printer.

SUMMARY OF THE INVENTION

It is an object of the present invention to provide an image formation apparatus and method thereof capable of forming a high quality image by preventing displacement of a position for starting image transfer.

In one aspect of this invention, a mark is provided on the intermediate transfer body and a mark detection unit detects this mark. Further, an image formation unit form an image with at least two colors on the intermediate transfer body based on a timing specification signal generated by a timing specification signal generation unit. The timing instruction signal, based on which the image formation is performed, is initialized each time the mark on intermediate transfer body is detected by the mark detection unit. Thus, the timing instruction signal is counted anew each time the specified position on the intermediate transfer belt passes under the detection unit.

In another aspect of the present invention, a plurality of image formation units and an image formation timing specification unit which specifies timing for image formation to each of said plurality of image formation units are provided. The image formation units have a non-scan type of light source for exposure. The image formation timing instruction unit can adjust the timing of the image formation according to the necessity. Thus, when the formed color image shows a color displacement, a user can set optimal timing of image formation adjusting the color displacement.

Other objects and features of this invention will become apparent from the following description with reference to the accompanying drawings.

BRIEF DESCRIPTION OF THE DRAWINGS

FIG. 20 is a view showing general configuration of a color printer having an intermediate transfer body.

DESCRIPTION OF THE PREFERRED EMBODIMENTS

First to fourth embodiments of the present invention are described in detail below.

Processes for forming an image in the present invention are based on the general electrostatic recording system. Namely, an electrostatic latent image corresponding to a certain color is written on a photosensitive body homogeneously electrified by an electrifier in the dark. This electrostatic latent image is visualized by a development unit and is transferred onto an intermediate transfer belt.

Such development units are provided in a first image formation section and a second image formation section provided in an image formation apparatus. Each of the development unit visualizes the electrostatic latent images for two colors. Thus, the two development units visualize the toner images for four colors. The four colors include the three primary colors (cyan (C), magenta (M), yellow (Y)) and black. Two colors out of these four colors of the electrostatic latent image are visualized by each development unit. Thus, the image formation apparatus according to the present invention can form a full-color image.

In the image formation apparatus as described above, while one image transfer area on the intermediate transfer belt is passing through two image formation sections, toner images of one color are successively formed on the transfer area by the image formation sections. The intermediate transfer belt is again passed through each of the image formation sections so that toner images of different colors are formed by the image formation sections on the same transfer area. With the operations as described above, after the same transfer area passes the two image formation sections twice respectively, a full-color image is formed on this transfer area.

When this full-color toner image is transferred onto a paper, a full-color image can be transformed on the paper. The full-color image formed on the paper is further fixed by a fixation unit on the paper. With the operations described above, the image to be finally formed by this image formation apparatus is complete.

General configuration of an image formation apparatus which forms an image with the image formation process as described above according to an embodiment of the present invention and normal operations of the apparatus are explained below. The general configuration and normal operations of the image formation apparatus described below are common to all of the first to fourth embodiments described hereinafter. Accordingly, description for general configuration and normal operations of the image formation apparatus is omitted in description of the second to fourth embodiments, and only differences between this image formation apparatus will be explained in these embodiments.

Figure 1:
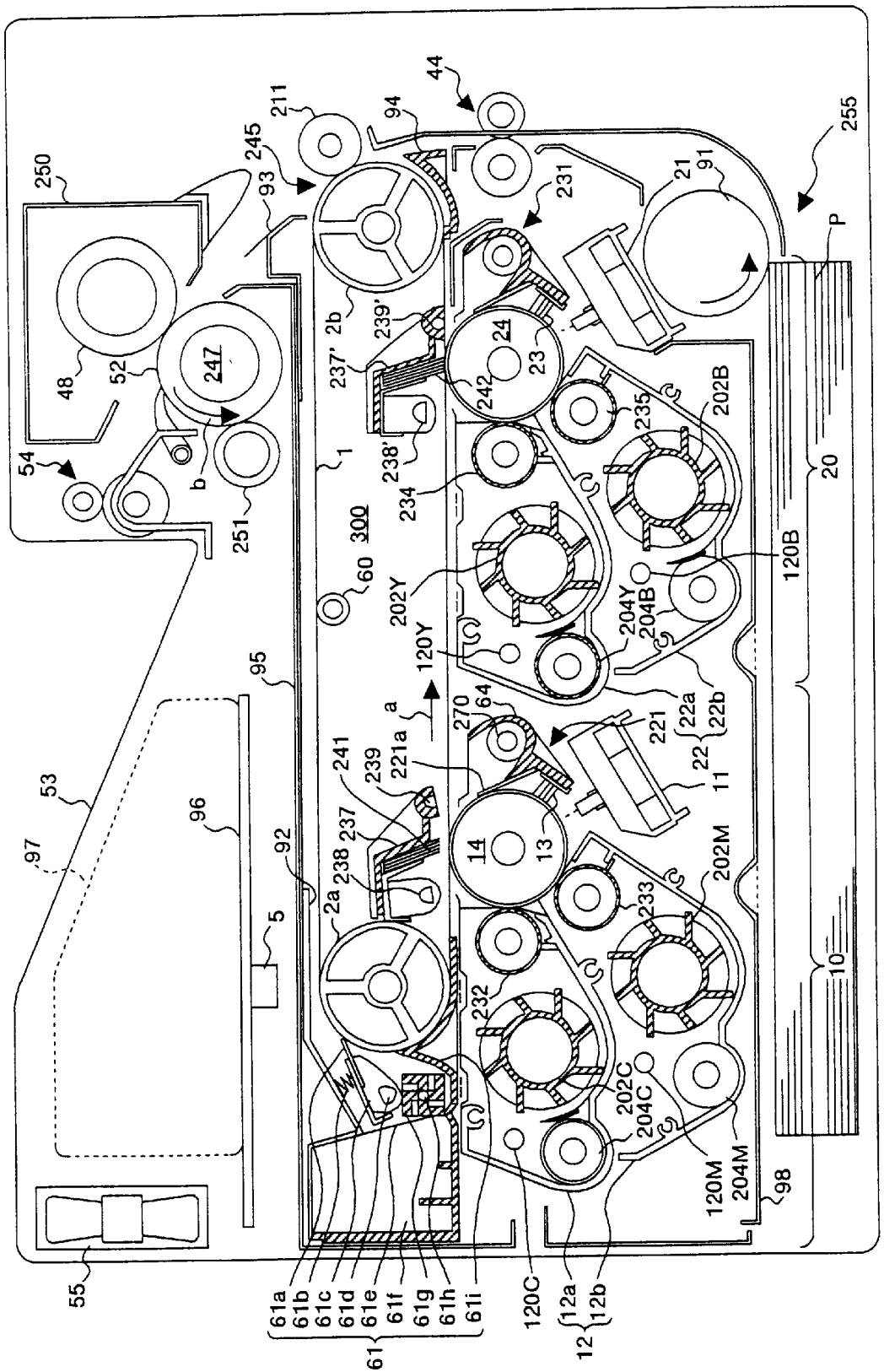
FIG. 1 is a view showing configuration of an execution section which executes image formation in an image formation apparatus according to an embodiment of the present invention.

A. General configuration of the image formation apparatus:

FIG. 1 is a view showing general configuration of an execution section which executes image formation in the image formation apparatus according to the present invention. In the image formation apparatus shown in the figure, a drum-shaped photosensitive body (a photosensitive drum) is used as an image carrier, and such components as an electrifier, a write unit, a development unit, and a cleaning unit are provided around this photosensitive drum to form a first image formation section 10 and a second image formation section 20. The first image formation section 10 and second image formation section 20 are located at a specified space therebetween along a plane in which an intermediate transfer belt 1 moves.

An intermediate transfer belt unit 300 is provided above the first image formation section 10 and the second image formation section 20. The intermediate transfer belt unit 300 has a driving roller 2a and a slave roller 2b, and the intermediate transfer belt 1 is spanned between the driving roller 2a and slave roller 2b. This intermediate transfer belt 1 is driven by the driving roller 2a so that it runs in a direction indicated by the arrow a in the figure. The first image formation section 10 and the second image formation section 20 are provided along the lower surface in a plane in which the intermediate transfer belt 1 moves.

Appropriate tension is given to the intermediate transfer belt 1 by a tension roller 60. Length of the intermediate transfer belt 1 is equal to the length of area where an image is not formed plus the length of a paper with the maximum size that can be used in this image formation apparatus according to the embodiment of the present invention.

The first image formation section 10 and second image formation section 20 have the same configuration, and are detachably mounted with the same posture on a main frame of the image formation apparatus. The first image formation section 10 comprises a first photosensitive drum 14, a brush shaped first electrifier 13 which homogeneously electrifies the surface of the first photosensitive drum 14, a first write unit 11 which writes an electrostatic latent image corresponding to a specific color onto the first photosensitive drum 14 having been electrified by the first electrifier 13, and a first development unit 12 which develops this electrostatic latent image. The first development unit 12 comprises a developer 12a for color A and a developer 12b for color C. Further, the first photosensitive drum 14 has a cleaning unit 221 which cleans the first photosensitive drum 14.

On the other hand, the second image formation section 20 comprises a second photosensitive drum 24, a brush shaped second electrifier 23 which homogeneously electrifies the surface of the second photosensitive drum 24,a write unit 21 which writes an electrostatic latent image corresponding to a specific color onto the second photosensitive drum 24 having been electrified by the second electrifier 23, and a second development unit 22 which develops the electrostatic latent image. The second development unit 22 comprises a developing device 22a for color B and a developing device 22b for color D. Further, the second photosensitive drum 24 has a cleaning unit 231 which cleans the second photosensitive drum 24.

The photosensitive drum 14 in the first image formation section 10 and the second photosensitive drum 24 in the second image formation section 20 are so controlled that the components rotate in synchronization to rotation of the intermediate transfer belt 1. The rotation speed accurately matches with the speed of movement of the intermediate transfer belt 1. It is allowable to employ a corona discharger or an electrifying unit based on the roller system in place of the first electrifier 13 or the second electrifier 23.

Further, the first development unit 12 and second development unit 22 use a developer made from two components, and a toner and a carrier (the two materials are generically called a developer) each for a specific color are accommodated in each of the development units 12a, 12b, 22a, and 22b.

The first development unit 12 and second development unit 22 develop electrostatic latent images formed by the first electrifier 13 and second electrifier 23 as well as by the first write unit 11 and second write unit 21 on the first photosensitive drum 14 and second photosensitive drum 24 using development rollers 232, 233, 234, and 235 provided thereon respectively. The development rollers 232, 233, 234, and 235 each function as a development unit respectively. In the embodiment of the present invention, development rollers based on the so-called magnetic brush developing system each rotating a non-magnetic sleeve around a fixed magnet are used as the developing rollers 232, 233, 234, and 235.

Further, the four units of development devices 12a, 12b, 22a, 22b comprise paddles 202M, 202C, 202Y, and 202B each as a developer agitator or carrier screws 204M, 204C, 204Y, and 204B each as a toner supplier respectively. The paddles 202M, 202C, 202Y, and 202B have a spiral feather 1C and 8 sheets of radial plate for agitating and carrying a developer respectively. The feather is spirally wound around each of the carrier screws 204M, 204C, 204Y, and 204B.

The developer 12a is explained here as an example. The paddle 202M and carrier screw 204 carry, when rotating, a developer in opposite directions respectively because of configuration of this rotary shaft. As a result, the developer is homogeneously distributed in a longitudinal direction of a shaft of the development roller 232. As the developing device described above, for instance the color developing device disclosed in Japanese Patent Laid-Open Publication No. HEI 8-160697 may be employed.

Further, a transfer brush 241 to which a bias voltage for transfer is loaded is provided in the first photosensitive drum 14 and a transfer brush 242 to which a bias voltage is loaded is provided in the second photosensitive drum 24 respectively so that the transfer brushes 241 and 242 can freely get closer or apart from the first and second photosensitive drums 14 and 24 respectively via the intermediate transfer belt 1 provided therebetween. A transfer roller 211 to which a bias voltage for transfer is loaded is provided for the slave roller 2b so that the two rollers can freely get closer or apart from each other.

When the image is not transferred, the first photosensitive drum 14 and second photosensitive drum 24 are positioned a little below the intermediate transfer belt 1. Further, in a transfer step in which toner images on the first photosensitive drum 14 and second photosensitive drum 24 are transferred onto the intermediate transfer belt 1, the transfer brush 241 and transfer brush 242 make the first photosensitive drum 14 and second photosensitive drum 24 contact the intermediate transfer belt 1.

Detail configuration of the transfer brushes 241, 242 and portions therearound is explained here. The transfer brush 241 is fixed to a swinging body 237, and the swinging body 237 swings around a shaft 238 supported by a non-movable member as a fulcrum. The transfer brush 241 is located at a free end of the swinging body 237. Further, a transfer roller 239 is provided at the free end of the swinging body 237.

In the configuration described above, it is allowable that the transfer brush 241 and intermediate transfer belt 1 are always contacting each other. In the embodiment of the present invention, however, a swinging angle of the swinging body 237 is so controlled that the transfer brush 241 and intermediate transfer belt 1 contact each other only during a transfer step in which a toner image on the first photosensitive drum 14 is transferred onto the intermediate transfer belt 1. Because of such a control, the transfer brush 241 and transfer roller 239 are kept away from the intermediate transfer belt 1 in steps other than the transfer step, so that wearing caused by contact between the transfer brush 241 and the intermediate transfer belt 1 can be suppressed.

A swinging body 237', a shaft 238', and a transfer roller 239' are provided in the portion around the transfer belt 242. This configuration is the same as that of the transfer belt 241 and the portion therearound, so that any further description is not provided here. The transfer belt 241 and transfer belt 242 contact and get away from the intermediate transfer belt 1 at different timing respectively. FIG. 1 shows a state where the transfer brush 241 and transfer roller 239 are away from the intermediate transfer belt 1 and the transfer brush 242 and transfer roller 239 are contacting the intermediate transfer belt 1.

As the transfer brush 242 and transfer roller 2391 contact via the intermediate transfer belt 1 the second photosensitive drum 24 at different timing respectively, it is possible to make the intermediate transfer belt 1 contact the second photosensitive drum 24 with a specified nip width to improve the transfer capability of the second photosensitive drum 24. Similarly, the transfer capability of the first photosensitive drum 14 using the transfer brush 241 and transfer roller 239.

It is needless to say that the configuration described above and including the transfer roller 239, transfer 239', transfer brushes 241, 242, and related members thereof has a depth in a direction vertical to a plane of FIG. 1 equivalent to the width of the intermediate transfer belt 1. Further a transfer roller or a corona discharger may be used in place of the transfer brushes 241, 242.

A transfer section 245 comprises the slave roller 2b and a transfer roller 211. A transfer unit formed as a corona discharger or a transfer brush may be used in place of the transfer roller 211.

On the other hand, a cleaning device 61 is so provided that it can freely contact or get away from the slave roller 2b. Thus cleaning device 61 removes the toner remaining on the surface of the intermediate transfer belt 1. Operations for contacting the cleaning device 61 to and getting it off from the slave roller 2b are executed by a drive unit for a not shown cleaning device of the intermediate transfer body.

Configuration of the cleaning device 61 is explained below in more detail. The cleaning device 61 comprises a blade 61a which can freely contact and get away from the intermediate transfer belt 1, a swinging body 61c which supports the blade 61a, a shaft 61d which supports the swinging body 61c, an elastic member 61b comprising a spring energizing the swinging body 61c in a direction in which the blade 61a is pressed to the intermediate transfer belt 1, a guide 61i which guides toner r paper powder scraped off by the blade 61a downward, a swastika shaped of rotary body 61g provided under the guide 61i, a plate spring 61e so provided that a free edge thereof contact the rotary body 61g, and a box 61f provided in the contrary side from the rotary body 61g with the plate spring 61e therebetween.

In the configuration as described above, the rotary body 61g rotates around a central shaft 61h thereof. A bottom edge of the plate spring 61e is supported by a frame 92. Further, the shaft 61d is coupled to a drive unit not shown to control this drive unit. Because of this configuration, the swinging body 61c rotates the blade 61a to get it away from the intermediate belt 1 against an energizing force of the elastic member 61b and maintain the state. In addition, the swinging body 61c can release this rotating force and set the blade 61a in a state where the blade 61a is contacted to the intermediate transfer belt 1 by an energizing force of the elastic member 61b.

It is required that the blade 61a does not disturb the toner image on the intermediate transfer belt 1. Therefore, usually the blade 61a is away from the intermediate transfer belt 1, and contacts the intermediate transfer belt 1 having finished transfer of a toner image onto a paper P in the transfer roller 211 only at specified timing to scrape off residual toner and paper powder. The residual toner and paper powder scraped off as described above is sent as mixed waste along the guide 61i because of its own weight to the rotary body 61g. The rotary body 61g intermittently bends the plate spring 61e in response to the rotating state to feed the mixed waste into the box 61f. It is needless to say that the configuration including the blade 61a, guide 61i, rotary body 61g, box 61f, and related members thereof has a depth in a direction vertical to a plane of FIG. 1 equivalent to the width of the intermediate transfer belt 1.

After the transfer step described above, the first photosensitive drum 14 and second photosensitive drum 24 are cleaned by the cleaning unit 221 and the cleaning unit 231 respectively. The cleaning unit 221 has a cleaning blade 221a having a length (width) in a direction along a rotation axis of the first photosensitive drum 14 and a shaft support section 64 with a U-shaped cross section. The residual toner scraped off by the cleaning blade 221 is recovered into the shaft support section 64 and further is fed out because of rotation of an auger 270 to a not shown box-shaped residual toner take-out section to be recovered therefrom.

The cleaning unit 231 has a cleaning blade having a length (width) in a direction along the rotation axis of the second photosensitive drum 24 and a shaft support section with a U-shaped cross section. Configuration of the cleaning unit 231 is the same as that of the cleaning unit 221 described above, so that its explanation is omitted.

A paper feeder 255 which feeds the papers P piled up thereon sheet by sheet towards the right direction in this figure is provided under the first image formation section 10 and second formation section 20. The paper P fed from this paper feeder 255 is supplied by a paper-feed roller 91 and a pair of resist rollers 44 to a transfer section 245. The paper-feed roller 91 is pivotably supported by a not shown unmovable member and coupled to a not shown drive system, and rotates during the paper-feed operation. The piled-up papers P (described as a paper bundle hereinafter) are aligned to each other by a guide not shown, placed on a bottom plate, and are fed by the paper-feed roller 91 sheet by sheet from the top of the paper bundle.

The bottom plate on which a paper bundle is placed is controlled using the known means in such a way that, when the papers P are fed by the paper-feed roller 91 and a height of the paper bundle decreases, the bottom plate moves up equivalent to the decrease in the height. Therefore, the paper P at a top of the paper bundle always contacts the paper-feed roller 91 with an appropriate contact force. A pair of feed rollers or the like may be provided in the image formation apparatus according to the embodiment of the present invention.

A fixation device 250 comprising a heating roller 247 rotating in the direction indicated by an arrow b and a pressurizing roller 48 rotating in the press-fit state to the heating roller 247 is provided diagonally above the transfer section 245. The heating roller 247 contacts an application roller 251 which applies an offset prevention liquid to a surface thereof according to the necessity. Further, claw 52 contacts the surface of the heating roller 247 and removes the paper P therefrom.

In this image formation apparatus the components forming this image formation apparatus may be grouped into several blocks. For instance, the paper feeder 255 is positioned in a bottom section of this image formation device, and is separated from the first image formation section 10 and second image formation section 20 by a partition plate 98. The first development device 12 and second development device 22 are located just above the partition plate 98, and sometimes toner used in the developing device may drop therefrom. With the configuration as described above, the partition plate 98 covers the papers P. Therefore, the toner that crops does not make the papers P dirty.

Accommodated in a space surrounded by the partition plate 98 and the intermediate transfer belt 1 are the first write unit 11 and second write unit 21, the first development device 12 and second development device 22, the first photosensitive drum 14 and the first electrifier 13 or cleaning unit 221 around the first photosensitive drum 14 (the components are unitized and sometimes are called as a photosensitive unit), and the second photosensitive drum 24 and second electrifier 23 or cleaning unit 231 around the second photosensitive drum 24 (the components are unitized and sometimes are called as a photosensitive unit) or the like.

Out of these components, as described above, the first write unit 11, second write unit 21, and photosensitive unit are detachably attached to the main frame of the apparatus. The circles 120M, 120C, 120Y, and 120B in the development unit 12a for color A, development unit 12b for color C, development unit 22a for color B, and development unit 22b for color D are feed ports from which toner is fed into the respective development unit. Toner for each color is fed from this feed port into each development unit.

A pair of paper discharge rollers 54 which feed out papers P fed out from the fixation device 250 onto a discharged paper tray 53 is provided in the downstream from the fixation device 250. Further, an air-discharge fan 55 for discharging the heat is shown in the left side from the discharged-paper tray 53 in this figure, and this air-discharge fan 55 prevents electric components accommodated under the discharged paper tray 53 from being heated by heat generated in the fixation device 250.

In the image formation apparatus according to the embodiment of the present invention described above, the first photosensitive drum 14 in the first image formation section 10 has the completely same configuration as that of the second photosensitive drum 24 in the second image formation section 20 in terms of form, size, material, and other factors. The first photosensitive drum 14 and second photosensitive drum 24 are required to rotate at the same linear speed. To satisfy this requirement, in the image formation apparatus shown in this figure, a not shown worm gear which is coaxial with and integrated to the first photosensitive drum 14 and a not shown worm gear which is coaxial with and integrated to the second photosensitive drum 24 are provided.

A worm is engaged with the gear of the first photosensitive drum 14 and also two worms provided on a common worm shaft are engaged with the gear of the second photosensitive drum 24, and this common worm shaft is driven by a motor. With the configuration as described above, it is possible to control the linear speed of both of the first photosensitive drum 14 and second photosensitive drum 24 to that of the intermediate transfer belt 1 by controlling a rotating speed of the motor which drives this worm shaft.

The intermediate transfer belt 1, and the drive roller 2a, slave roller 2b, transfer roller 211, transfer brushes 241, 242, transfer rollers 239, 239', and cleaning device 61, all of which are accessories of the intermediate transfer belt 1, are accommodated in a box-formed case built with the frame 92, frame 93 also functioning as a guide for papers, guide 61i, guide 94 and other components to form an intermediate transfer belt unit 300. This intermediate transfer belt unit 300 is supported by a guide provided under the partition plate 95 and not shown herein, and is dismountably attached to the main frame of the image formation apparatus.

A belt mark sensor 5 which detects a mark attached onto the intermediate transfer belt 1 is provided above the drive roller 2a. This belt mark sensor 5 is provided to detect a mark provided at the edge in a length (width) direction of a rotation shaft of the drive roller 2a for the intermediate transfer belt 1. Speed of rotation of the intermediate transfer belt 1 can be computed from information from the belt mark sensor 5. Timing of operations of the image formation apparatus in the image formation process is decided based on the information provided by this belt mark sensor 5. A key section of the present invention relates to decision of timing with this belt mark sensor 5, and this point is described in detail later.

The belt mark sensor 5 is attached directly or via a socket to an electric instrument board 96. Mounted in a space above the electric instrument board 97 are instruments which drive or control the image formation apparatus shown in the figure. The air heated by the heat generated from the components is discharged to the outside by the air-discharge fan 55.

The image formation apparatus can output an image onto a paper at a high speed in synchronism to rotation of the intermediate transfer belt 1, and uses a combination of a photosensitive drum as an image carrier, an LED as a write unit, and a photosensitive element. Configuration of the image formation apparatus according to the present invention is not limited to the above-described one, and as a variant of the image formation apparatus, an endless belt may be used as the image carrier. Further, a write unit having a laser as a light source may be used. The image carrier is not limited to a photosensitive body, and a member capable of forming an electrostatic latent image in response to an action by something other than light may be used for this purpose. When this type of member is used, a write unit which can cause electromagnetic changes on the image carrier in response to something other than light is used.

B. Image formation process:

An image formation process executed in the image formation apparatus is described below.

In the example of image formation process described below, at least three types of toners for primary colors A, B, and C are used to form toner images on an image carrier such as a photosensitive drum or a photosensitive belt, and the toner images are transferred and superimposed on each other on the intermediate transfer belt 1 as an intermediate transfer body. A color image is obtained with a transfer unit and according to a method in which the toner image on the intermediate transfer belt 1 is transferred onto a paper.

Figure 2:
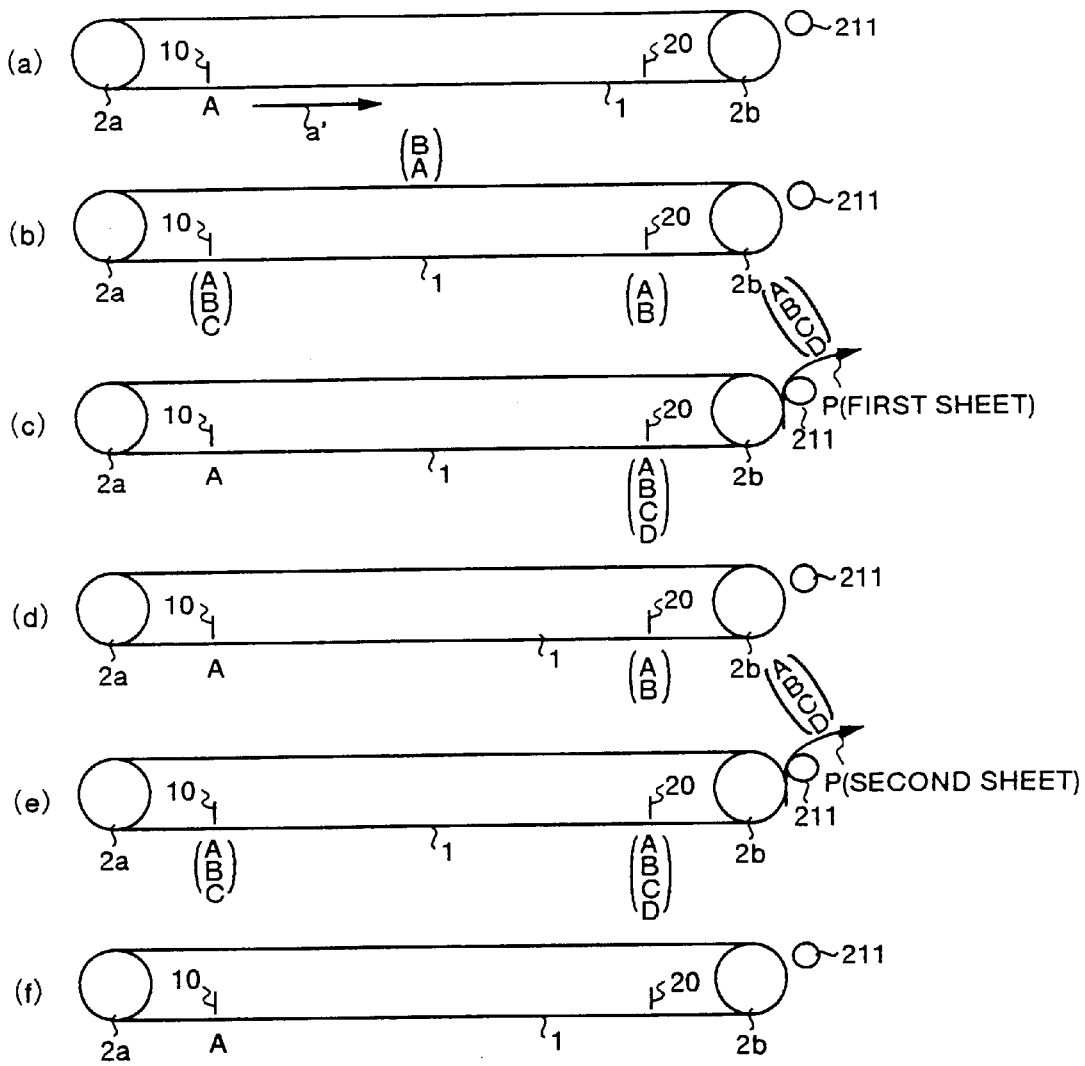
FIG. 2 is a view showing a general image formation process executed using the configuration shown in FIG. 1.
Figure 3:
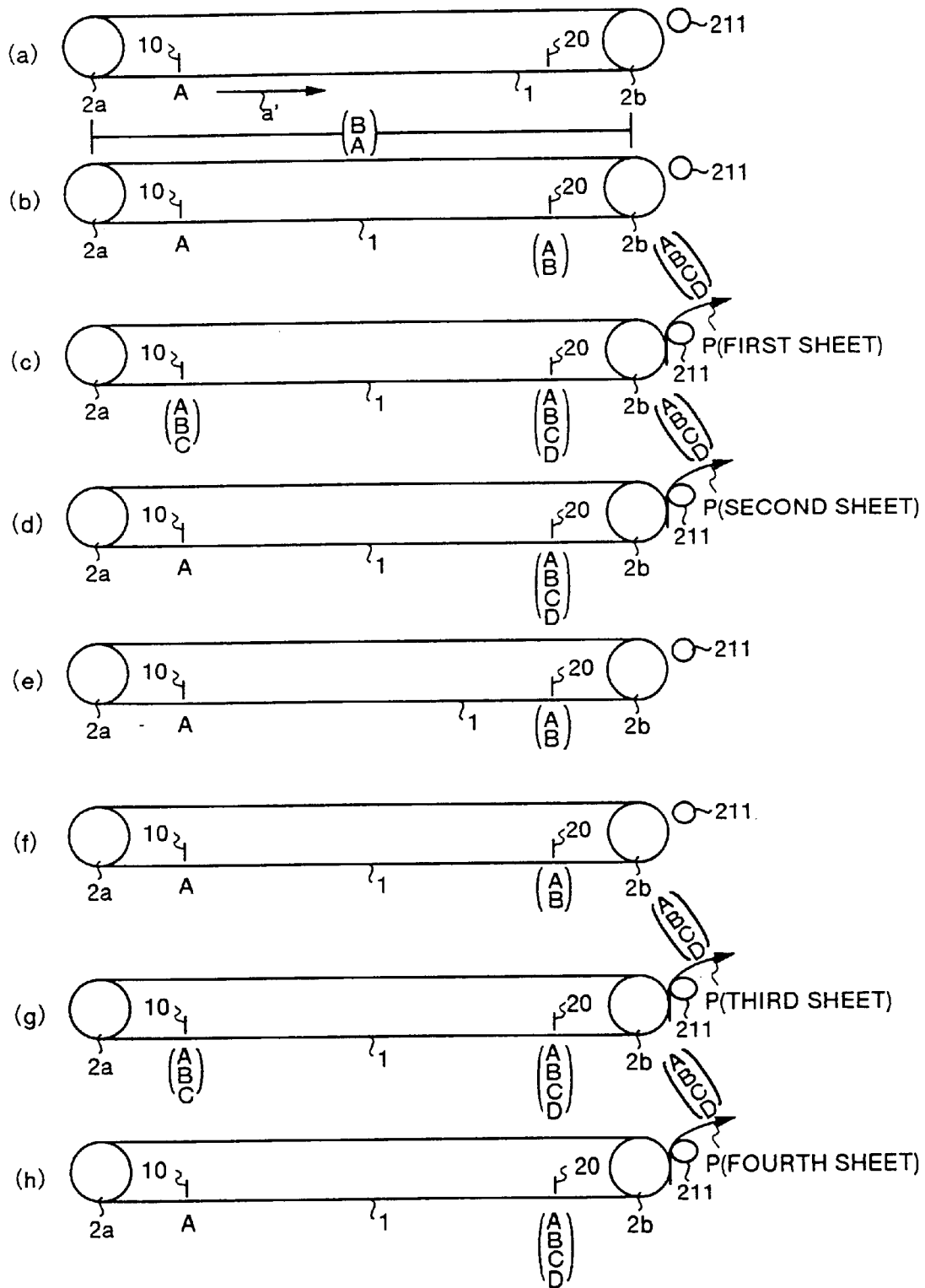
FIG. 3 is another view showing a general image formation processing executed using the configuration shown in FIG. 1.

FIG. 2 and FIG. 3 are views each showing the image formation process as described above, and a more simplified configuration of the intermediate belt unit 300 shown in FIG. 1 is shown in these figures. FIG. 2 shows operations of the intermediate transfer belt 1 under the condition below. The total length L of the intermediate transfer belt 1 is expressed by the equation L=m+α, wherein m indicates a length corresponding to the amount of movement of the paper P when the image is transferred onto the paper. FIG. 3 shows operations of the intermediate transfer belt 1 under the conditions below. The total length L of the intermediate transfer belt 1 is expressed by the equation L=2(m+α) (namely, when the intermediate transfer belt 1 is two times longer than that shown in FIG. 2).

Here α indicates the length of a portion of the paper in the direction along the intermediate transfer belt 1 on which an image is not formed (e.g. margin of the paper). It is assumed in FIG. 2 and FIG. 3 that α<m. The length α also changes according to the length of the area in which the image is formed on the intermediate transfer belt 1 or the length of the paper used. Due to the reason described above, there may be a case where α>m.

Operations of the belt are explained below with reference to FIG. 2.

(a) The first image formation section 10 transfers a toner image for color A onto the intermediate transfer belt 1.

(b) The second image formation section 20 transfers a toner image for color B onto the toner image for color A on the intermediate transfer belt 1. The first image formation section 10 then transfers a toner image for color C onto the toner images for colors A and B, thus the transfer of toner images for colors A, B, C to the intermediate transfer belt 1 finishes. The intermediate transfer belt 1 has finished nearly one rotation.

(c) The second image formation section 20 then transfers a toner image forcolor D (black) onto the tonerimages for colors A, B, C obtained in the step (b) explained above. With this operation, a (full-color) toner image with colors A, B, C, and D is complete. This full color toner image is transferred by the transfer roller 211 to the paper P (first sheet) . The transfer of the image to the paper P is performed during the second rotation of the intermediate transfer belt 1.

(d) When it is required to obtain a plurality of sheets of full-colorprint in the image formation process described above, a toner image for color A is transferred to the intermediate transfer belt 1 in the first image formation section 10 simultaneously when a toner image for color D is transferred in the second image formation section 20 in the step (c) described above. Further, a toner image for color B is transferred onto the toner image for color A in the second image formation section 20 to form toner images for colors A and B.

(e) The second image formation section 20 transfers a toner image for color C onto the toner image for colors A and B formed in the step (d) described above. Further, the first image formation section 10 transfers a toner image for color D onto the toner image for colors A, B, C. The full-color toner image obtained according to the above procedure is transferred onto the paper P (second sheet). Transfer of the toner image onto the second sheet of paper P is performed during the fourth rotation of the intermediate transfer belt 1.

(f) Transfer of the full-color toner image onto the third sheet of paper P and on is executed by repeating the steps (c) described above during the sixth rotation of the intermediate transfer belt 1 and on.

Operations of the intermediate transfer belt are described below assuming that the total length L of the intermediate transfer belt is equal to $2(m+\alpha)$. Thus, the length of the intermediate transfer belt is two times longer than that of the intermediate transfer belt shown in FIG. 2.

Operations of the belt are explained below with reference to FIG. 3.

(a) The first image formation section 10 transfers a toner image for color A onto the intermediate transfer belt 1.

(b) The first image formation section 10 further transfers a subsequent toner image for color A onto the intermediate transfer belt 1. At the same time, the second image formation section 20 transfers a toner image for color B onto the toner image for color A transferred previously. With this operation, the toner image previously transferred is changed to toner images for colors A and B. At this stage, the intermediate transfer belt 1 has nearly finished the first rotation.

(c) The first image formation section 10 then transfers a toner image for color C onto the toner image for colors A and B obtained in the step (b) described above. The second image formation section 20 then transfers a toner image for color D onto the toner image for colors A, B, C obtained as described above. As a result, the toner images transferred previously are changed to a full-color toner image. The full-color toner image is transferred by the transfer roller 211 onto the paper P (first sheet). Transfer of the full-color toner image onto the first sheet of paper is started when the intermediate transfer belt 1 has nearly finished one and a half rotation.

(d) When it is required to obtain a plurality of sheets of full-colorprint in the image formation process, the first image formation section 10 transfers the toner images for colors A, B, C transferred later in the step (c) described above. The first image formation section 10 further transfers a subsequent toner image for color A, while the second image formation section 20 transfers a toner image for color D onto the toner image for colors A, B, and C. Thus, a full-color toner image is formed on the intermediate transfer belt 1. This full-color toner image is transferred onto the paper P (second sheet). This transfer is started when the intermediate transfer belt 1 has nearly finished two and a half rotations.

(e) The second image formation section 20 transfers a toner image for color B onto the toner image for color A transferred by the first image formation section 10 in the step (d) described above.

(f) While the first image formation section is transferring a subsequent toner image for color A onto the intermediate transfer belt 1, the second image formation section 20 transfers toner images for color B onto the toner image for color A transferred in the step (d) described above to form a toner image for colors A and B on the intermediate transfer belt 1.

(g) The first image formation section 10 transfers a toner image for color C onto the toner images for colors A and B obtained in the step (d) described above to form a toner image for colors A, B, C on the intermediate transfer belt 1. The second image formation section 20 transfers a toner image for color D onto the toner image for colors A, B, C to form a full-color toner image on the intermediate transfer belt 1. This full-color toner image is transferred onto the paper P (third sheet). Transfer of the image onto the third sheet of paper is started when the intermediate transfer belt 1 has nearly finished three and a half rotations.

(h) Further, the first image formation section 10 transfers a subsequent toner image for color A onto the intermediate transfer belt 1. At the same time, the second image formation section 20 transfers a toner image for color D onto the toner image for colors A, B, C obtained in the step (f) described to form a full-color toner image on the intermediate transfer belt 1. This full-color toner image is transferred onto the paper P (fourth sheet). Transfer of image onto the fourth sheet of paper is started when the intermediate transfer belt 1 has nearly finished four and a half rotations.

As described above, when the length of the intermediate transfer belt 1 is two times or more longer than that of the paper P, the first sheet of paper P with a full-color image having been transferred thereto is obtained when the intermediate transfer belt 1 rotates two times. The second sheet of paper P with a the full-color toner image having been transferred thereon is obtained when the intermediate transfer belt 1 has finished three rotations. The third sheet of paper with the full-color toner image having been transferred thereto is obtained when the intermediate transfer belt 1 has finished four rotations. The fourth sheet of paper P with the full-color toner image having been transferred thereto is obtained when the intermediate transfer belt has finished five rotations. Namely, transfer of an image to each paper P is started at a point of time when the intermediate transfer belt 1 has finished rotations by times equivalent to a value obtained by adding 0.5 to the number of sheet, and the paper P with a full-color image having been transferred thereto is obtained at a point of time when the intermediate transfer belt 1 has finished rotations by times corresponding to a number obtained by adding 1 to the number of sheet.

Configuration of a key section of the image formation apparatus according to the present invention is described in detail with reference to related figures. All of the image formation apparatuses described in the embodiments of the present invention are color printers (described simply as a printer hereinafter).

Figure 4:
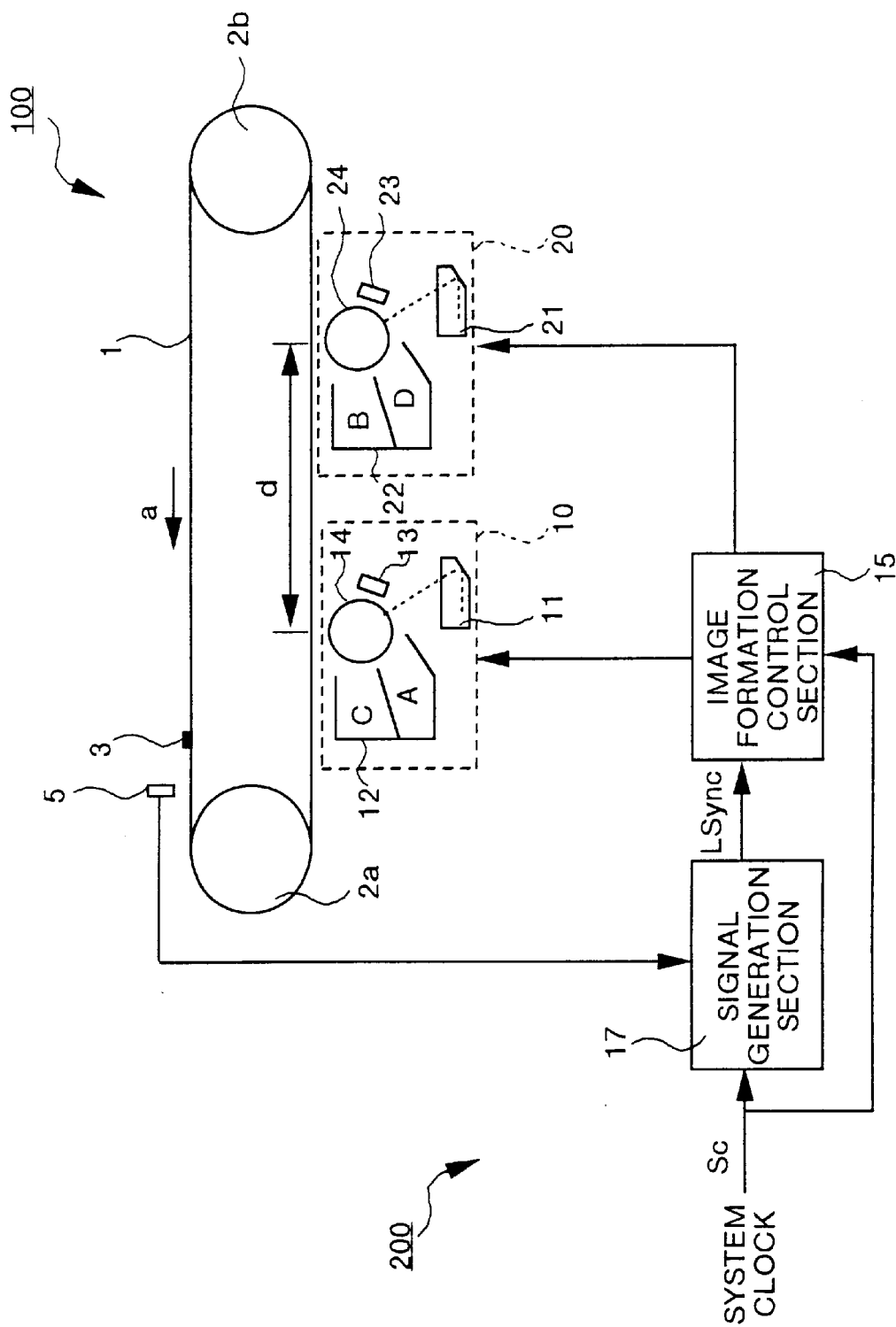
FIG. 4 is a block diagram showing an image formation apparatus according to a first embodiment of the present invention.
Figure 5:
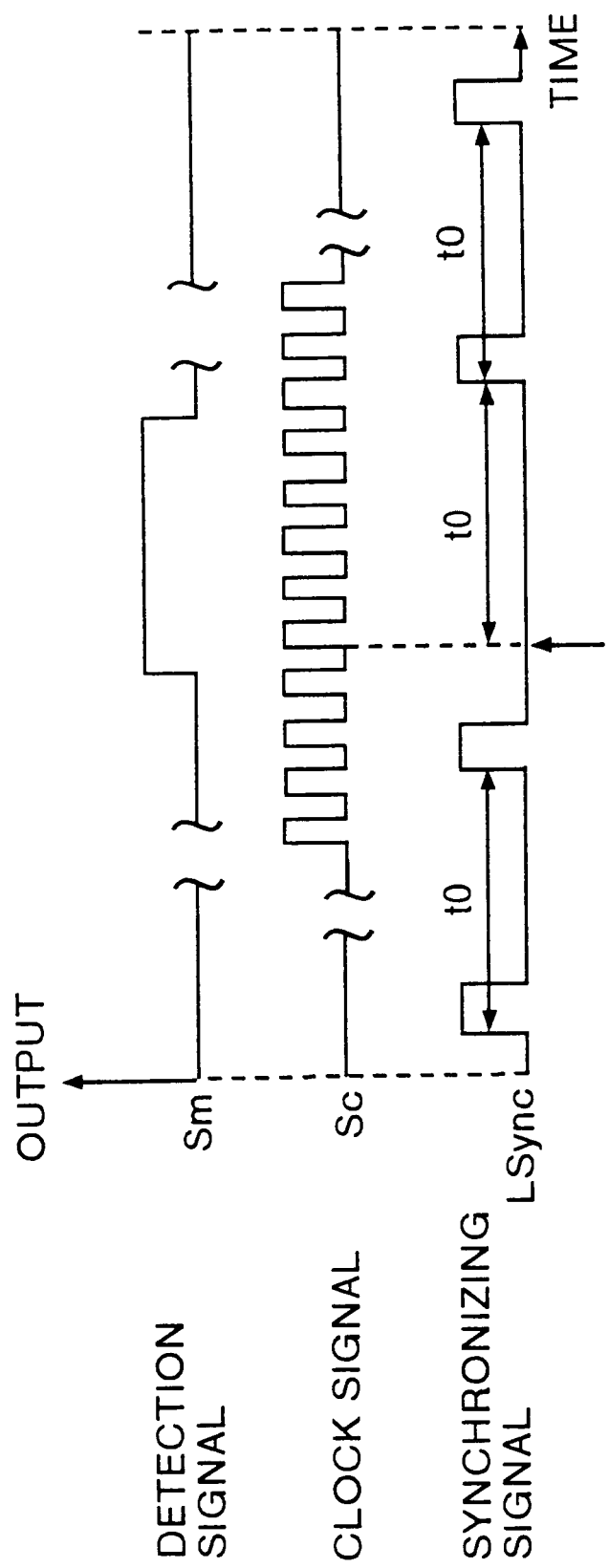
FIG. 5 is a view showing signals transmitted from or received by the image formation apparatus according to the first embodiment of the present invention.
Figure 6:
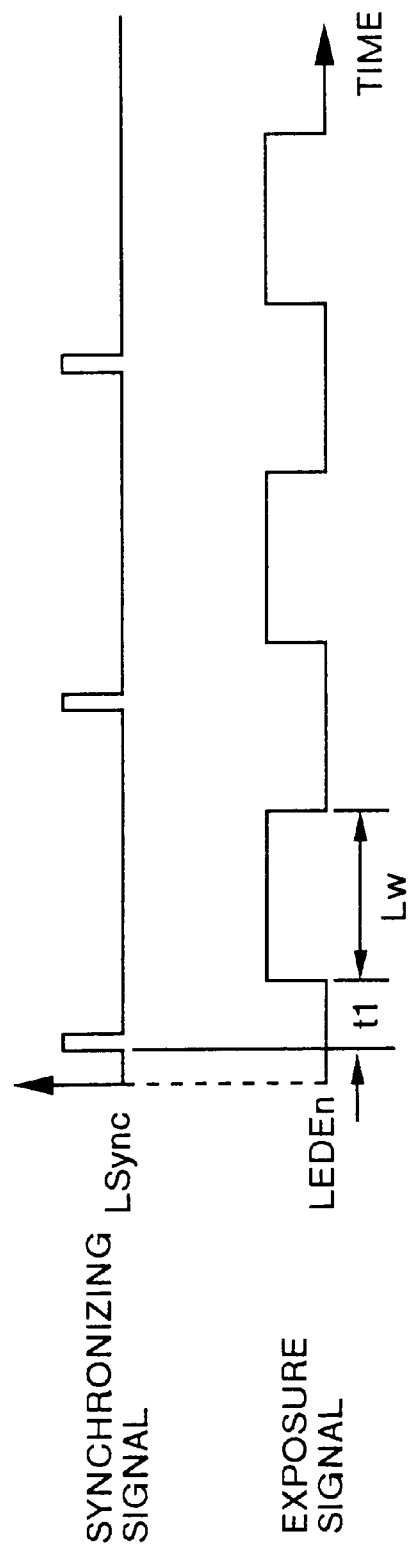
FIG. 6 is another view showing signals transmitted from or received by the image formation apparatus according to the first embodiment of the present invention.

FIG. 4 explains the first embodiment of the present invention. FIG. 5 and FIG. 6 are views each showing signals transacted in the printer according to the first embodiment of the present invention. In FIG. 5 and FIG. 6 a signal output is shown on the vertical axis and time on the horizontal axis.

The configuration shown in FIG. 4 largely comprises an execution section 100 which executes image formation and a control section 200 which controls the execution section 100. The execution section 100 has the intermediate transfer belt 1 which is a belt type of intermediate transfer body. This intermediate transfer belt 1 is wound around and rotated by a pair of drive roller 2a and a slave roller 2b. The intermediate transfer belt 1 rotates in the direction shown by the arrow. A mark 3 indicating a specified position is provided on a surface of the intermediate transfer belt 1, and further a belt mark sensor 5 for detecting the mark 3 is provided above the intermediate transfer belt 1. This belt mark sensor 5 outputs a detection signal each time the mark 3 is detected. FIG. 4 schematically shows only a portion of the image formation apparatus explained with reference to FIG. 1.

The first image formation section 10 and second image formation section 20 are provided on the surface of the intermediate transfer belt 1 such that they are separated at a distance d from each other. The first image formation apparatus 10 has a first photosensitive drum 14, a first electrifier 13 which electrifies the first photosensitive drum 15, a first write unit 11 which writes an electrostatic latent image on the first photosensitive drum 14, and a first development device 12 which develops the written electrostatic latent image to form a toner image. The first development device 12 has two types of toner for color A and for color C, and forms a toner image for color A and that for color C.

The second image formation section 20 has the same configuration as that of the first image formation section 10. Namely, the second image formation section 20 has a second photosensitive drum 24, a second electrifier 23, a second write unit 21, and a second development device 22. The second development device 2 has two types of toner for color B and for color D, and forms a toner image for color B and that for color D, and this is the only difference between the first image formation section 10.

In the configuration described above, rotation of the first photosensitive drum 14 and second photosensitive drum 24 is synchronized to movement of the intermediate transfer belt 1, and at the same time speed of rotational of the first photosensitive drum 14 and second photosensitive drum 24 is equivalent to the running speed of the intermediate transfer belt 1. The first photosensitive drum 14 and second photosensitive drum 24 are usually a little separated from the intermediate transfer belt 1, and contact the intermediate transfer belt 1 only when they transfer the image onto the intermediate transfer belt 1.

The control section 200 has a signal generation section 17 which generates and sends a synchronizing signal as a timing instruction signal for instructing timing for image formation to the first image formation section 10 as well as to the second image formation section 20, and an image formation control section 15 which controls the first image formation section 10 and second image formation section 20 based on the synchronizing signal generated by the signal generation section 17.

A clock signal generated by a system clock generator incorporated in the printer and a detection signal outputted from the belt mark sensor 5 are inputted into the signal generation section 17. The signal generation section 17 counts this clock signal and generates a synchronizing signal when the count value reaches a prespecified value. In the signal generation section 17 according to the first embodiment, a count value for the clock signal is initialized, namely returned to zero, each time a detection signal is inputted thereto.

Namely, as shown in FIG. 5, a detection signal Sm and a clock signal Sc are inputted into the signal generation section 17. The clock signal Sc has a constant pulse width, and is always generated at a constant cycle. The signal generation section 17 counts the clock signal Sc, and outputs, so long as a detection signal Sm is not inputted, a synchronizing signal LSync indicating that time t0 has passed each time the count value reaches, for instance, 6. When a detection signal Sm is inputted, the signal generation section 17 initializes the count value regardless of the present count value, counts a clock signal Sc inputted next as 1, and outputs the synchronizing signal LSync when the count value time again reaches 6.

The image formation control section 15 receives a synchronizing signal LSync as shown in FIG. 6, and outputs an exposure signal LEDEn indicating timing for starting exposure to the first image formation section 10 and second image formation section 20 at a point of time when a time t1 has passed from the timing of reception of the synchronizing signal LSync. This exposure signal LEDEn instructs timing for operations of the first and second write units 11, 21, and its pulse width Lw is previously set according to density of the image to be formed. As shown in FIG. 4, the clock signal Sc is inputted also to the image formation control section 15, so that the image formation control section 15 determines passage of time t1 by counting clock signals Sc.

Further, the image formation control section 15 provides signals to the first photosensitive drum 14 and second photosensitive drum 24 to control the exposure based on the exposure signal LEDEn. With this operation, an electrostatic latent image is formed on these drums. The image formation control section 15 then outputs a signal instructing development and transfer to the first and second image formation sections 10, 20 at a specified timing so as to control the color image formation. When four colors A, B, C, D are used by the printer shown in FIG. 4 to form a color image, the steps of exposure, development, and transfer are repeated 4 times in all to form toner images for the colors, which are transferred onto and superimposed on each other on the intermediate transfer belt 1 to form a full-color image.

Namely, in the first embodiment of the present invention described above, the synchronizing signal LSync is initialized each time the mark 3 is detected. Because of this feature, even if the mark 3 detection cycle changes due to irregular rotation of the intermediate transfer belt 1 or for some other reasons, the synchronizing signal LSync is always generated in synchronism to detection of the mark 3. In other words, the synchronizing signal LSync is generated only when the intermediate transfer belt 1 is at a specified running position.

By executing formation and transfer of toner images in synchronism to this synchronizing signal LSync, the toner images are always transferred on a specified position of the intermediate transfer belt 1, and all of the toner images for colors A, B, C, D are accurately superimposed on each other on the intermediate transfer belt 1 with no positional displacement between the toner images generated. A high quality color image including no positional displacement can be formed by simultaneously transferring the toner images for four colors superimposed on each other on the intermediate transfer belt 1 onto a paper.

As another method of preventing color displacement in a color image even when the length of the intermediate transfer belt 1 changes, it is conceivable, for instance, to provide a mark on an intermediate transfer belt and calculate the time required for the intermediate transfer belt to rotate once by detecting this mark, and to adjust the speed of the intermediate transfer belt so that the time is equal to a preset time. With the configuration described above, however, the process of transferring an electrostatic latent image from a photosensitive drum to an intermediate transfer belt also receives the effect of the speed of the belt. To maintain the original conditions for high precision transfer, it is required to adjust not only the speed of the intermediate transfer belt, but also conditions for the transfer process.

On the contrary, in the first embodiment of the present invention, the intermediate transfer belt 1 can be synchronized to the first and second image formation sections 10, 20 by only initializing the synchronizing signal LSync. Therefore, the first embodiment can be carried our more easily as compared to the configuration described above, and the designed image quality can be realized suppressing the color displacement in the color image and maintaining the original transfer conditions for a printer.

Figure 7:
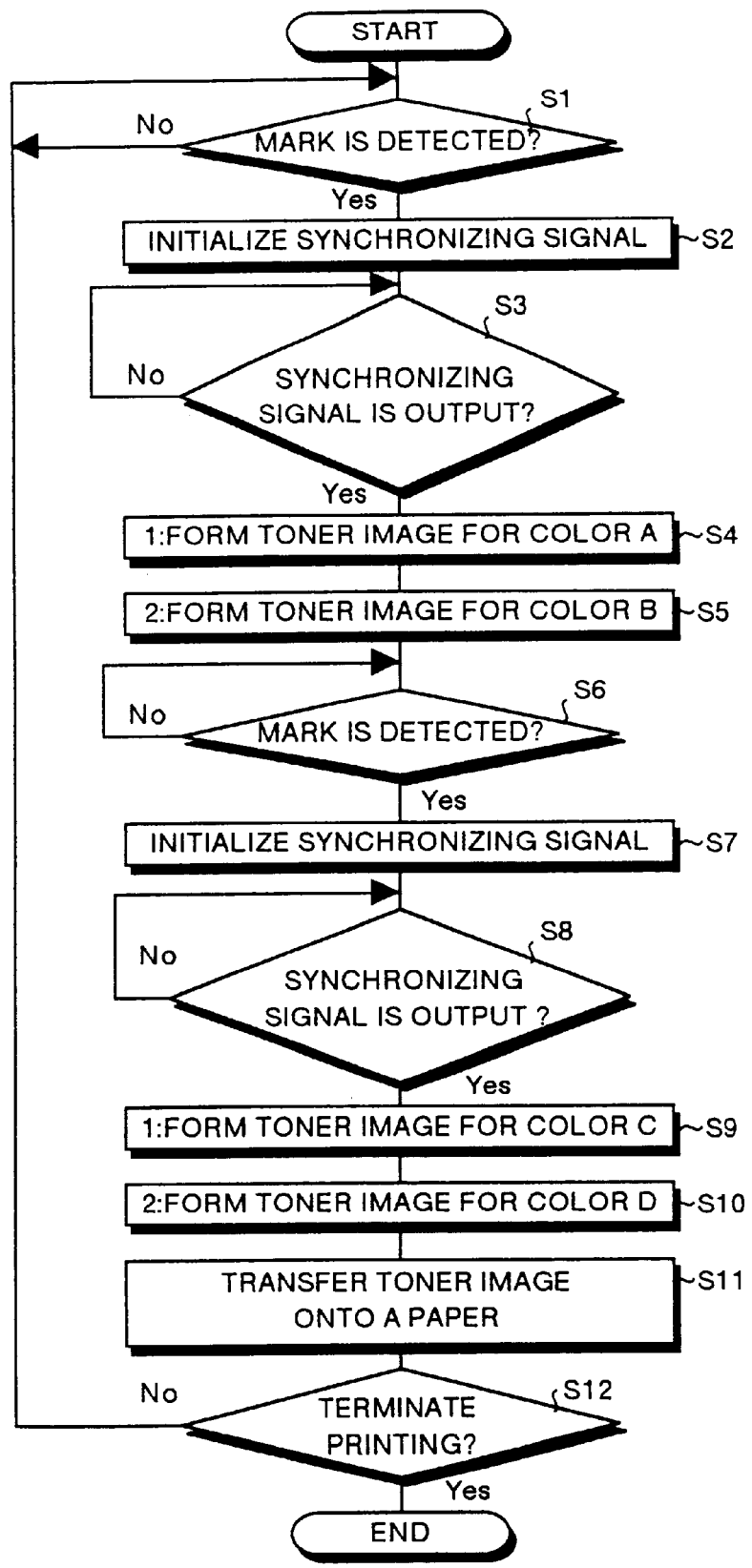
FIG. 7 is a flow chart showing a series of operations for forming a color image executed in the first embodiment of the pesent invention.

Processing for forming a color image with four colors using the printer according to the first embodiment described above is described below. FIG. 7 is a flow chart showing a series of operations for forming a color image in the first embodiment. It is assumed herein that the length of the paper onto which a formed color image is transferred is 1. Thus, the total length L of the intermediate transfer belt 1 can be obtained through the equation $L=2(1+\alpha)$. Namely, the total length L of the intermediate transfer belt 1 is two times or more longer than that of the paper.

A series of operations in the flow chart shown in FIG. 7 are started, for instance, at a point of time when an operator pushes a start button of a printer to give an instruction for starting printing to the printer. With this start operation, the intermediate transfer belt 1 starts moving. Further, the system clock generator inside the printer is turned ON and the clock signal Sc is outputted. The clock signal Sc is inputted into the signal generation section 17, which generates the synchronizing signal LSync. With this operation, it becomes possible to detect the mark 3.

Figure 8:
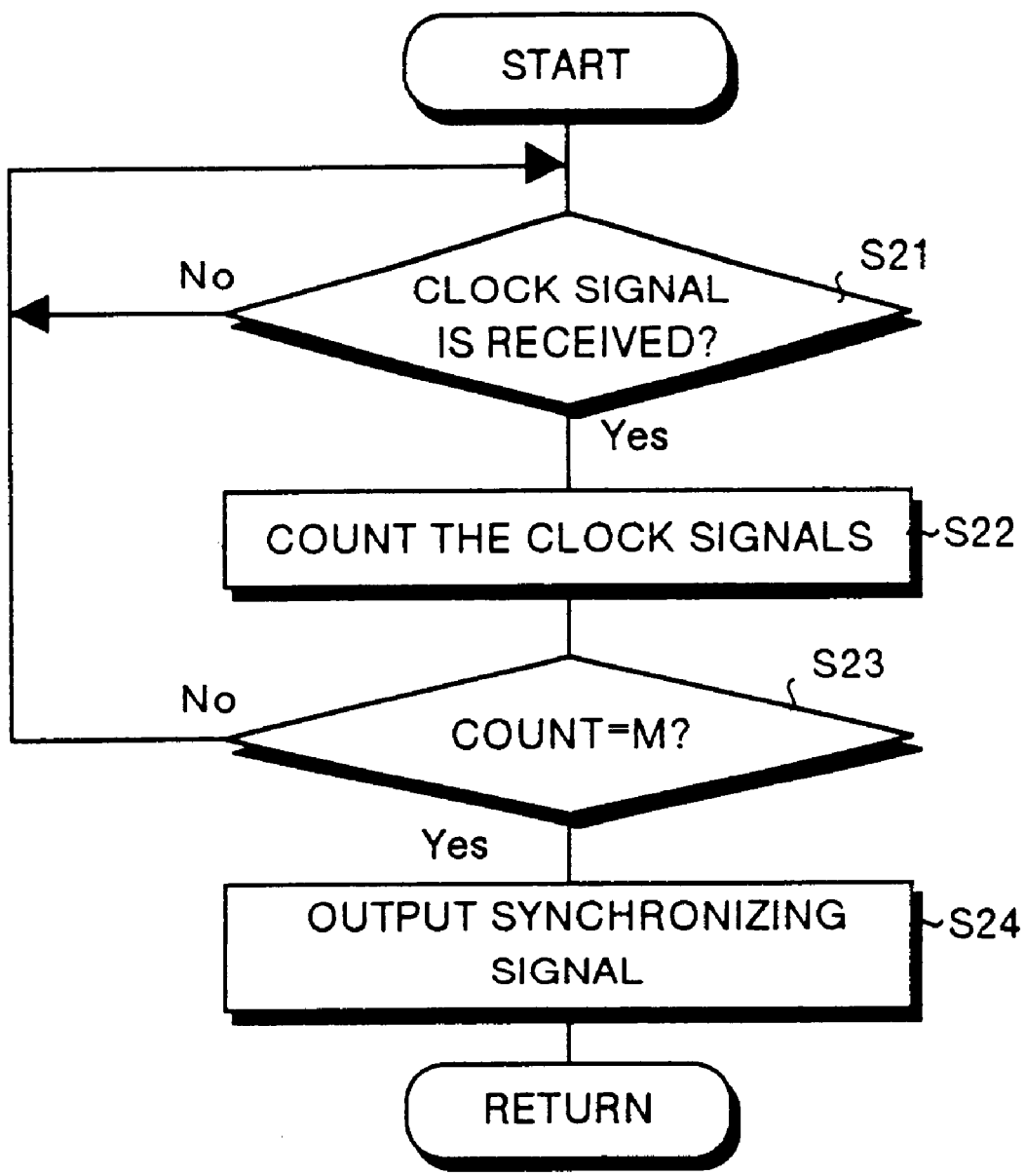
FIG. 8 is a flow chart showing an example of processing for generating a synchronizing signal when a series of operations shown in the flow chart in FIG. 7 is started.

A program may be used to execute the processing from start of output of the clock signal Sc until generation of the synchronizing signal LSync. An example such a program is shown in the flow chart shown in FIG. 8. When, the signal generation section 17 receives the clock signal (step S21; Yes) it counts the clock signal Sc (step S22), and outputs the synchronizing signal LSync (step S24) when the count value reaches a prespecified number M (step S23: Yes).

After the above processing is executed, when the intermediate transfer belt starts running steadily and the mark 3 is detected (step S1), the synchronizing signal LSync in the signal generation section 17 is initialized (step S2). This initialization of the synchronizing signal LSync is executed by generating an interrupt signal for returning the count value to zero.

After this initialization, the clock signal Sc is counted again, and the synchronizing signal LSync is outputted from the signal generation section 17. In the image formation control section 15, it is determined whether the synchronizing signal LSync is outputted (step S3) or not. When the synchronizing signal LSync is outputted, a specified number of synchronizing signals LSync are counted. Then it is determined whether the synchronizing signal LSync is outputted during the period of FGate which is a write signal in the auxiliary scan direction. If the signal LSync is outputted during FGate is output, the image formation control section 15 outputs an exposure signal LEDEn based on this synchronizing signal LSync, and gives an instruction to the first image formation section 10 to form a toner image for color A. The first image formation section 10 having received the exposure signal LEDEn forms an electrostatic latent image on the first photosensitive drum 14 using the first electrifier 13 and write unit 11. This electrostatic latent image becomes a toner image for color A when developed with toner for color A, and is then transferred onto the intermediate transfer belt 1 (step S4).

The signal generation section 17 then outputs an exposure signal LEDEn during the period of FGate, while the toner image for color A is approaching the second image formation section 20, also to the second image formation section 20. This exposure signal LEDEn is generated at a point of time when synchronizing signals LSync corresponding to a time from a point of time when the FGate signal is generated in the first image formation section 10 based on the synchronizing signal LSync described in step S3 until a point of time when the toner image for color A to be transported over a distance d. The second image formation section 20 receives the exposure signal LEDEn, forms a toner image for color B with a second electrifier 23 and a write unit 21 on the second photosensitive drum 24 like in the step S4 described above, and transfers the toner image for color B onto the toner image for color A previously formed on the intermediate transfer belt 1 (step S5).

When the intermediate transfer belt 1 rotates once and the mark 3 is again detected by the belt mark sensor 5 (step S6: Yes), the synchronizing signal LSync is again initialized (step S7). After the initialization, when it is determined that the synchronizing signal LSync outputted (step S8: Yes), atoner image for color C is formed on the first photosensitive drum 14 in the first image formation section 10, the toner image for color C is transferred onto the toner image for colors A and B on the intermediate transfer belt 1 after a specified number of synchronizing signals LSync are counted, namely after a specified period of time has passed (step S9).

While the intermediate transfer belt 1 rotates and the toner images transferred onto the intermediate transfer belt 1 in the superimposed state are approaching the second image formation section 20, a toner image for color D is formed on the second photosensitive drum 24 in the second image formation section 20. This toner image is further transferred onto the toner image for colors A, B, C on the intermediate transfer belt 1 (step S10). With this operation, formation of a toner image on the intermediate transfer belt 1 is complete.

When a toner image for color D is transferred to the intermediate transfer belt 1 in step S10, simultaneously, a paper is fed from a paper supply unit of the printer not shown in this figure. The toner images for colors A, B, C, D superimposed on each other are transferred all at once onto the paper (step S11), and then fixed on a fixation section not shown herein. After the toner image is fixed, toner remaining on the intermediate transfer belt 1 is removed by a cleaning device not shown herein.

It is then determined whether the print processing has been completely finished (step S12) or not. When it is necessary to print a color image on a subsequent paper, system control returns to step S1, and all of the operations described above are repeated (step S12: No). When it is determined that the print processing is to be terminated, the operation sequence is terminated (step S12: Yes).

The light source for exposure for the write unit described above is a non-scan type of LED array. Configuration of the present invention is not limited to the first embodiment described above. Although the image formation apparatus according to the first embodiment of the present invention is a color printer, the present invention can be applied to other type of image formation apparatuses including a color copying machine.

Figure 9:
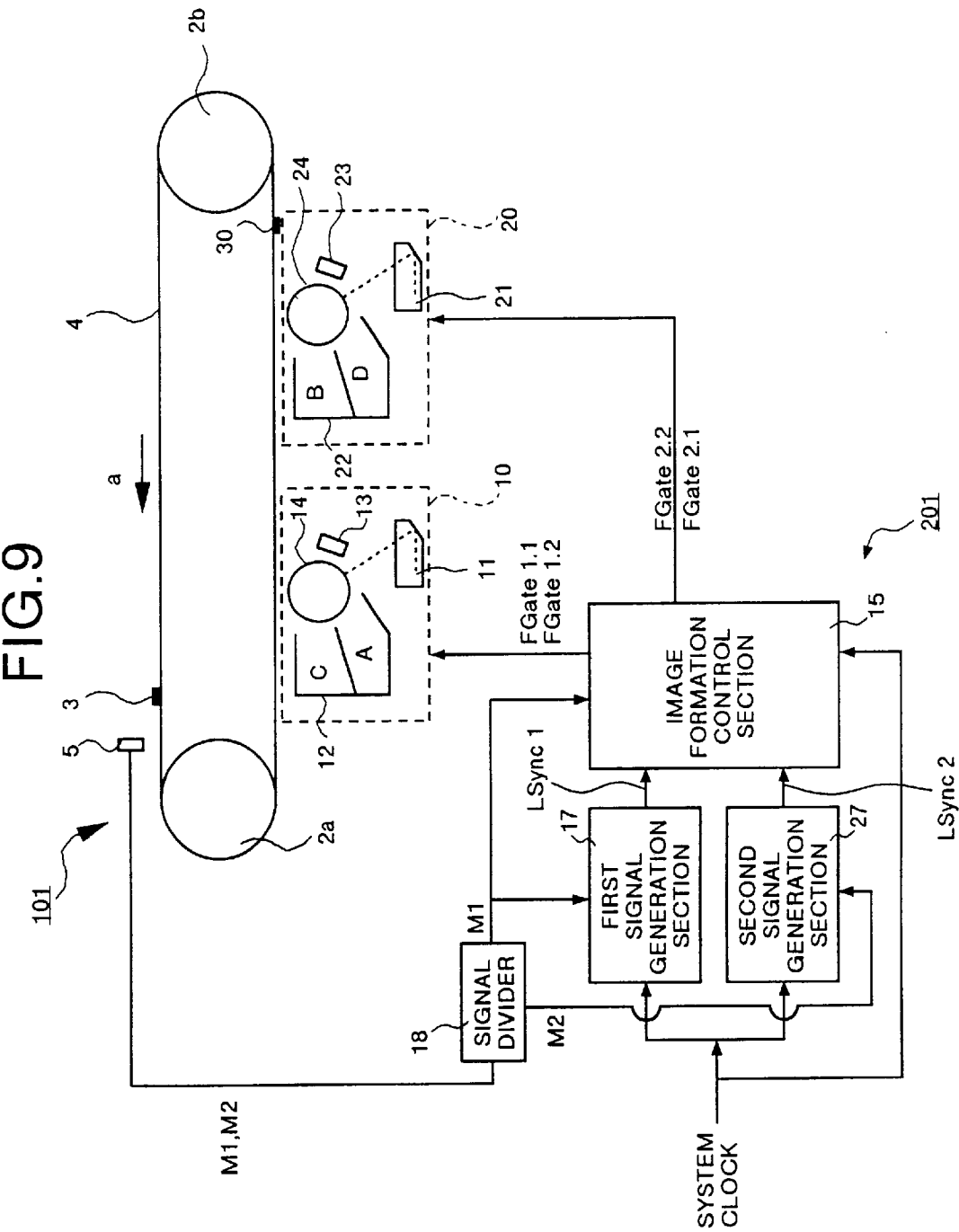
FIG. 9 is a block diagram showing an image formation apparatus according to a second embodiment of the present invention.
Figure 10:
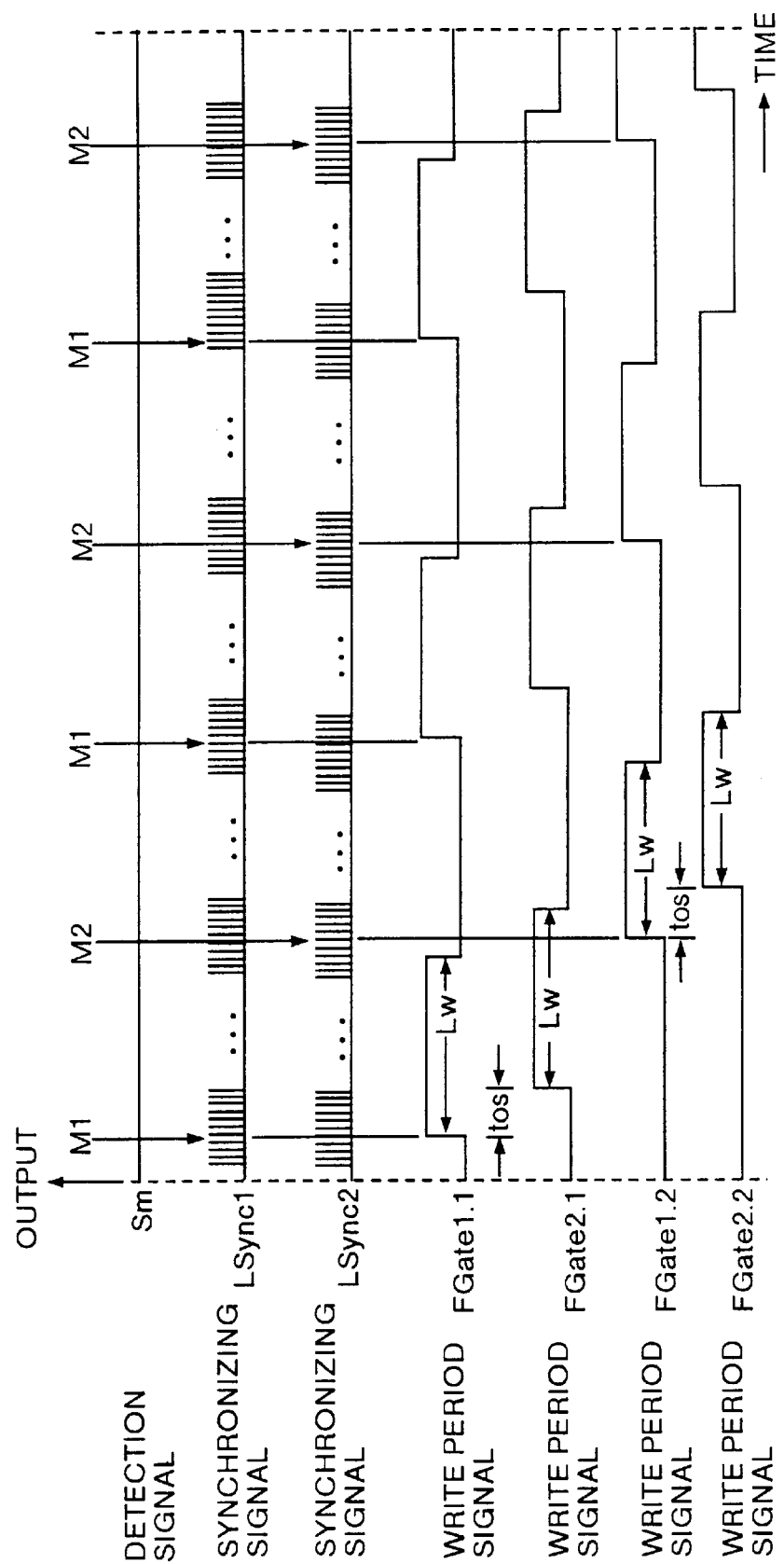
FIG. 10 is a view showing signals transmitted from or received by the image formation apparatus according to the second embodiment of the present invention.

The second embodiment of the present invention is described below. FIG. 9 shows the configuration of a printer according to the second embodiment of the present invention. FIG. 10 explains a signal received by and transmitted from the printer shown in FIG. 9. The printer according to the second embodiment is different from that according to the first embodiment only in the point that a plurality of marks and a plurality of signal generating sections which are initialized when the mark is detected are provided. The same reference numerals are assigned to the same components as those of the printer shown in FIG. 4, and their explanation is omitted.

The printer shown in FIG. 9 largely comprises an execution section 101 which executes image formation, and a control section 201 which controls the execution section 101. The execution section 101 has an intermediate transfer belt 4 with a first mark 3 and a second mark 30 provided thereon. A belt mark sensor 5 which detects the first mark 3 and the second mark 30 is provided above the intermediate transfer belt 4. The belt mark sensor 5 outputs a detection signal each time it detects the first mark 3 or the second mark 30.

The first image formation section 10 and second image formation section 20 are provided at a distance d therebetween along a surface of the intermediate transfer belt 4. This first and second image formation sections 10, 20 have the same configuration as that described in relation to the first embodiment. Toner images for color A and color C are formed in the first image formation section 10, while toner images for color B and color D are formed in the second image formation section 20.

The control section 201 has two signal generation sections; namely a first signal generation section 17 and a second signal generation section 27. The first signal generation section 17 is initialized each time the first mark 3 is detected, while the second signal generation section 27 is initialized each time the second mark 30 is detected. Further, the control section 201 has an image formation control section 15 which controls the first and second image formation sections 10, 20 based on synchronizing signals generated by the first and second signal generation sections 17 and 27.

A clock signal generated by a clock generator incorporated in the printer and detection signals Sm for the first mark and second mark 30 outputted from the belt mark sensor are inputted into the first and second signal generation sections 17, 27. The printer according to the second embodiment further comprises a signal divider 18 which classifies a detection signal Sm for the first mark 3 from that for the second mark 30, and output the detection signal Sm for the first mark 3 to the first signal generation section 17, and outputs the detection signal Sm for the second mark 30 is to the second signal generation section 27.

A synchronizing signal LSync and a write period signal FGate received by and outputted from the printer according to the second embodiment of the present invention are explained below with reference to FIG. 10. In FIG. 10, signal output is shown on the vertical axis, and time on the horizontal axis. The detection signal Sm in this figure shows the timing at which a signal M1 as a detection signal S indicating detection of the first mark 3 and a signal M2 as a detection signal S indicating detection of the second mark 30 are outputted respectively. The synchronizing signal LSync 1 shown here is outputted from the first signal generation section 17 that is initialized in response to the signal M1. The synchronizing signal LSync 2 shown here is outputted from the second signal generation section 27 that is initialized in response to the signal M2. A distance between the first mark 3 and second mark 30 on the intermediate transfer belt 4 is decided taking into considerations a time required for switching toner for one color to that for another color.

Further, the write period signal FGate 1.1 shown here is outputted based on the synchronizing signal LSync 1 to the first image formation section 10. The write period signal FGate 2.1 shown here is outputted based on the synchronizing signal LSync 1 to the second image formation section 20. The write period signal FGate 1.2 shown here is outputted based on the synchronizing signal LSync 2 to the first image formation section 10, and the write period signal FGate 2.2 shown here is outputted based on the synchronizing signal LSync 2 to the second image formation section 20.

In the second embodiment, a specified number of clock signals (not shown in the second embodiment) generated by a system clock are counted, and the synchronizing signal LSync 1 and synchronizing signal LSync 2 are generated in the first and second signal generation sections 17 and 27 respectively. The synchronizing signal LSync 1 is initialized when the signal M1, which indicates the detection of the first mark 3, is inputted. The synchronizing signal LSync 2 is initialized when the signal M2, which indicates detection of the second mark 30, is inputted.

The image formation control section 15 receives the synchronizing signals LSync 1 and 2 outputs a write period signal FGate 1.1 to the first image formation section 10 based on the initialized synchronizing signal LSync 1. The image formation control section 15 counts clock signals equivalent to the time tos from initialization of the synchronizing signal LSync 1, and outputs a write period signal FGate 2.1 to the second image formation section 20.

The image formation control section 15 outputs a write period signal FGate 1.2 to the first image formation section 10 based on the initialized synchronizing signal LSync 2. The image formation control section 15 then counts clock signals equivalent to the time tos from initialization of the synchronizing signal LSync 2, and outputs a write period signal FGate 2.2 to the second image formation section 20.

In the second embodiment 2 described above, two marks are provided on the intermediate transfer belt 4. Because of this configuration, after an operation for exposure is finished once, the next mark is detected within a short period of time, so that the next operation for exposure can be started immediately. Therefore, it is possible to provide a printer which can print color images at a higher speed.

Figure 11:
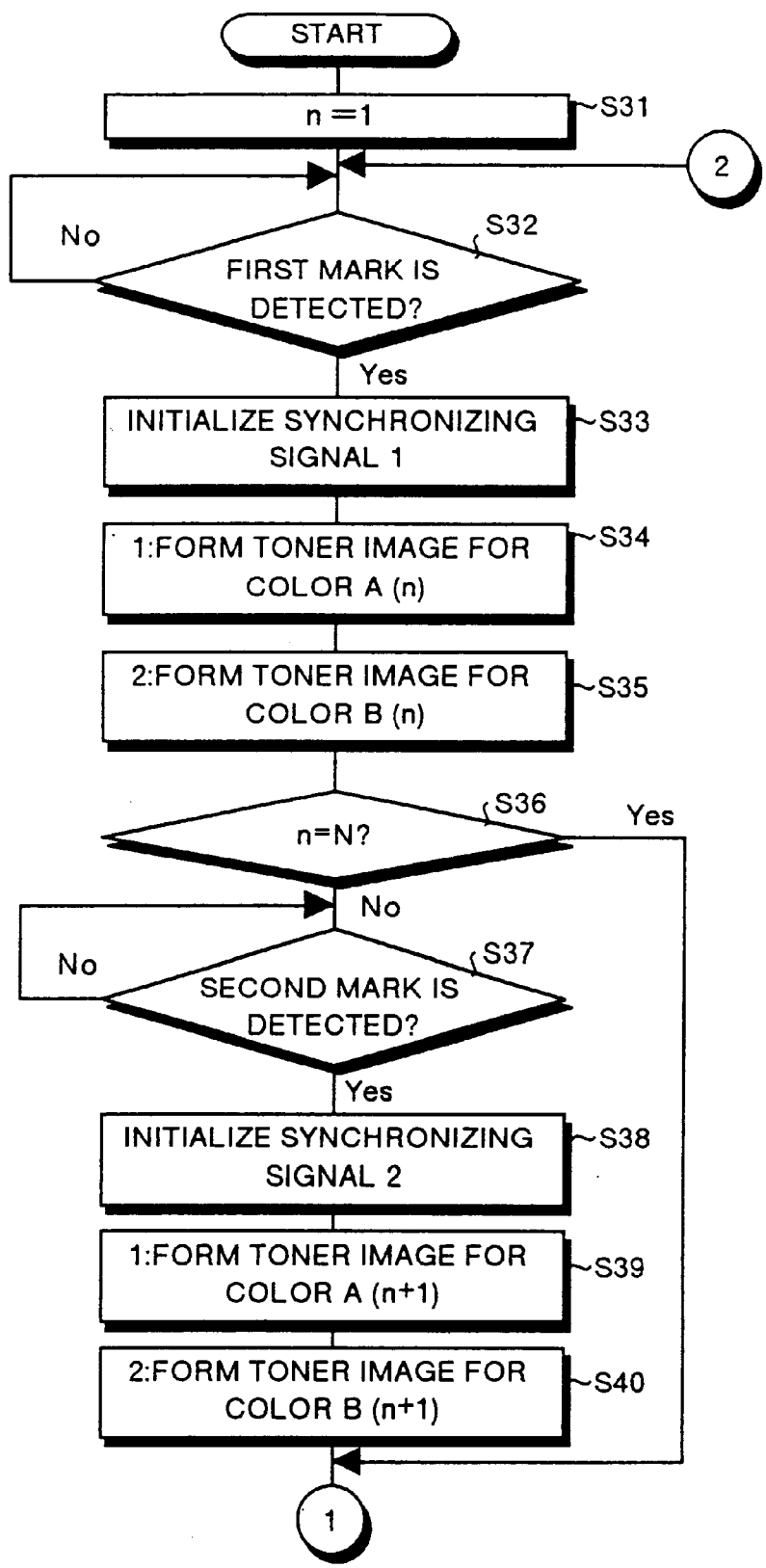
FIG. 11 is a flow chart showing a series of operations for forming a color image executed in the second embodiment of the present invention.
Figure 12:
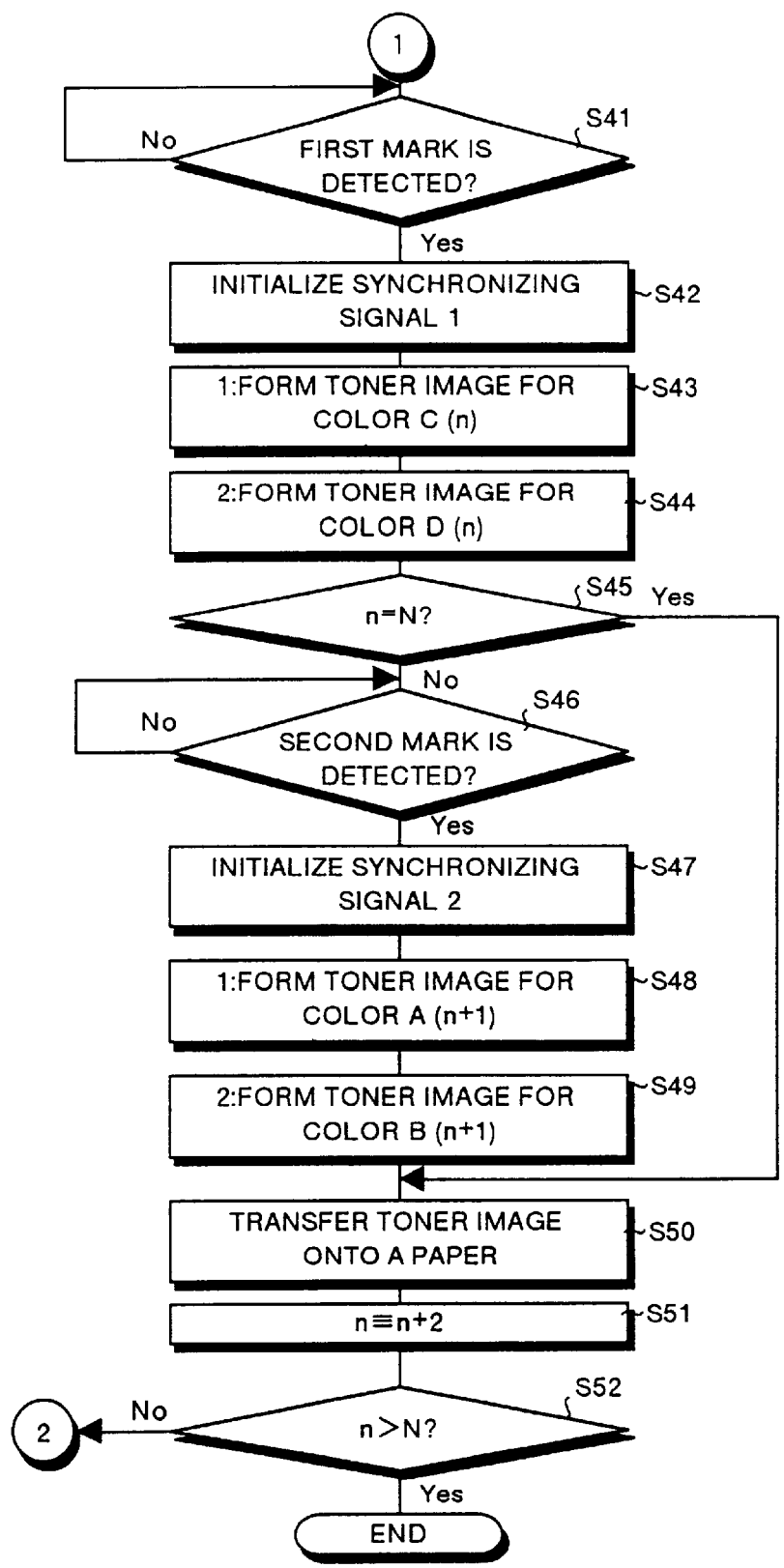
FIG. 12 is a flow chart showing a series of operations for forming a color image executed in the second embodiment of the present invention.

The processing for formation of a color image using four colors with the printer according to the second embodiment is described below. FIG. 11 and FIG. 12 are flow charts each showing a series of operations for forming a color image executed in the second embodiment. In the flow charts shown in FIG. 11 and FIG. 12, assuming that the length of the paper onto which the color image is transferred is L, the total length L of the intermediate transfer belt 1 can be obtained through the equation of $L=2(1+\alpha)$. Namely, it is assumed herein that the total length L of the intermediate transfer belt 1 is two times or more longer than the length of the paper.

In the flow charts shown in these figures, operations are started when an operator pushes the start button to give an instruction for starting the printing operation to the printer. With this start operation, the intermediate transfer belt 4 starts running with a number n of the papers set to one (step S31). This processing is required to successively form color images on a plurality of sheets of paper. In this flow chart, a total number of papers is expressed as N, and n indicates that the print processing is executed to the n-th paper.

A system clock generator is simultaneously turned ON and the clock signal is outputted. The clock signals are inputted into and counted by the first and second signal generation sections 17 and 27. The synchronizing signal LSync 1 is outputted from the first signal generation section 17 and synchronizing signal LSync 2 from the second signal generation section 27 respectively.

When the intermediate transfer belt 1 starts moving steadily and the first mark 3 is detected by the belt mark sensor (step S32), the synchronizing signal LSync 1 is initialized in the first signal generation section 17 (step S33). The image formation control section 15 outputs a write period signal FGate 1.1 to the first image formation section 10 based on the initialized synchronizing signal LSync 1. The first image formation section 10 having received the write period signal FGate 1.1 forms a toner image for color A on the first photosensitive drum 14, and when the formed toner image reaches a transfer start position on the intermediate transfer belt 4, the toner image is transferred onto the intermediate transfer belt 4 (step S34).

While the toner image for color A is approaching the second image formation section 20, the image formation control section 15 outputs a write period signal FGate 2.1 also to the second image formation section 20. This write period signal FGate 2.1 is generated at a point of time when synchronizing signals LSync corresponding to a time required from a point of time when the first mark 3 is detected and the write period signal FGate 1.1 is outputted until a point of time when the toner image for color A is carried over the distance d. The second image formation section 20 receives this write period signal FGate 2.1 and forms a toner image for color B on a second photosensitive drum 24. The toner image for color B is then transferred onto the toner image for color A previously formed on the intermediate transfer belt 4 (step S35).

Then a number n of the papers to be printed is compared to a total number N of the papers to be printed to determine whether the two values are equal to each other or not (step S36). As the result, when n and N are different from each other (step S36: No), whether the second mark 30 is detected or not is determined (step S37). When it is determined that the second mark is detected (step S37:Yes), the synchronizing signal LSync 2 outputted from the second signal generation section 27 is initialized (step S38).

When the synchronizing signal LSync 2 is initialized in the second signal generation section 27, the signal formation control section 15 outputs a write period signal FGate 1.2 based on the initialized synchronizing signal LSync 2. This write signal FGate 1.2 instructs the first image formation section 10 to form a toner image for color A for a color image to be printed on the next paper. In the following description, a toner image for a color image to be printed on the next paper is described as (n+1)-th toner image.

The first image formation section 10 having received the write period signal FGate 1.2 forms a toner image for color A on the first photosensitive drum 14 and transfers the toner image onto the intermediate transfer belt 4 (step S39). While the (n+1)-th toner image for color A is approaching the second image formation section 20, the image formation control section 15 outputs a write period signal FGate 2.2 also to the second image formation section 20. This write period signal FGate 2.2 is generated at a point of time when synchronizing signals LSync corresponding to a time from a point the write period signal FGate 1.2 is generated until a point of time when the toner image for color A is carried over the distance d. The second image formation section 20 receives this write period signal FGate 2.2, forms a toner image for color B, and then transfers the toner image for color B onto the toner image for color A previously formed on the intermediate transfer belt 4 (step S40).

When it is determined in step S36 that n is equal to N, namely that the printing should be finished (step S36: Yes), the processing from step S37 to step S40 is omitted, and the subsequent processing is executed.

When the first mark 3 is detected again by the belt mark sensor (step S41), the synchronizing signal LSync 1 is again initialized in the first signal generation section 17 (step S42). Then a write period signal FGate 1.1 is outputted from the image formation control section 15 to the first image formation section 10. When the first image formation section 10 receives the write period signal FGate 1.1, it forms a toner image for color C, and transfers the image for color C onto the toner images for colors A and B previously formed on the intermediate transfer belt 4 (step S43).

While the toner image for color C is approaching the second image formation section 20, the image formation control section 15 outputs a write period signal FGate 2.1 also to the second image formation section 20. This write period signal FGate 2.1 is generated at a point of time when synchronizing signals LSync corresponding to a time from a point of time when the write period signal FGate 1.1 is outputted until a point of time when the toner image for color C is carried over the distanced. When the write period signal FGate 2.1 is received, the second image formation section 20 forms a toner image for color D on the second photosensitive drum 24, and transfers the toner image for color D onto the toner images for colors A, B, C previously formed on the intermediate transfer belt 4 (step S44).

It is again determined whether n is equal to N (step S45) or not. When it is determined that n is different from N (step S45: No), it is determined whether the second mark 30 is detected (step S46). When it is determined that the second mark is determined (step S46: Yes), the synchronizing signal LSync 2 from the second signal generation section 27 is initialized (step S47) The image formation control section 15 outputs the write period signal FGate 1.2 based on the initialized synchronizing signal LSync 2 to the first image formation section 10. The first image formation section 10 having received the write period signal FGate 1.2 forms the (n+1)-th toner image for color C, and transfers the toner image onto the toner images for colors A and B previously formed on the intermediate transfer belt 4 (step S48).

While the (n+1)-th toner image for color C is approaching the second image formation section 20, the image formation control section 15 outputs the write period signal FGate 2.2 to the second image formation section 20. The second image formation section 20 receives the write period signal FGate 2.2, forms a (n+1)-th toner image for color D, and transfers the toner image onto the toner images for colors A, B, C previously formed on the intermediate transfer belt 4 (step S49).

The (n+1)-th toner images for colors A, B, C, D transferred onto each other on the intermediate transfer belt 4 are transferred to the paper in batch (step S50). The image formation control section 15 replaces n with n+2 (step S51), and again determines whether n is larger than N (step S52). When the result of determination indicates that n is not larger than N, namely that there are remaining papers to be printed (step S52: No), the processing in step S32 and on is repeated.

On the contrary, when it is determined in step S52 that n is larger than N (step S52: Yes), namely that there are no remaining papers to be printed, it is determined that the printing is to be finished, and the processing is terminated.

When it is determined in step S45 that n is equal to N, the processing sequence from step S46 to step S49 described above is omitted, and the n-th toner images for colors A, B, C, and D transferred on each other on the intermediate transfer belt 4 are transferred on to the paper in batch in step S50. Then the processing in step S51 and step S52 is executed, but the result of determination in step S52 will naturally be "Yes", so that the process is terminated.

The present invention is not limited to the second embodiment described above. Namely, although it is assumed in the second embodiment above to simplify the description that two marks are provided on the intermediate transfer belt 4 and also two signal generation sections which are initialized when the two marks are detected are provided, any number of marks and signal generation sections may be provided according to the necessity.

The third embodiment of the present invention is explained below. The color printer according to the third embodiment has a plurality of image formation sections each using a non-scan type of light source for exposure, and an intermediate transfer body onto which toner images are transferred by the image formation sections, and timing for image formation can be adjusted according to the necessity in each of the image formation sections. A timing adjustment section which executes the adjustment is provided independently, and a user can easily carry out the adjustment according to a state of the printer.

Figure 13:
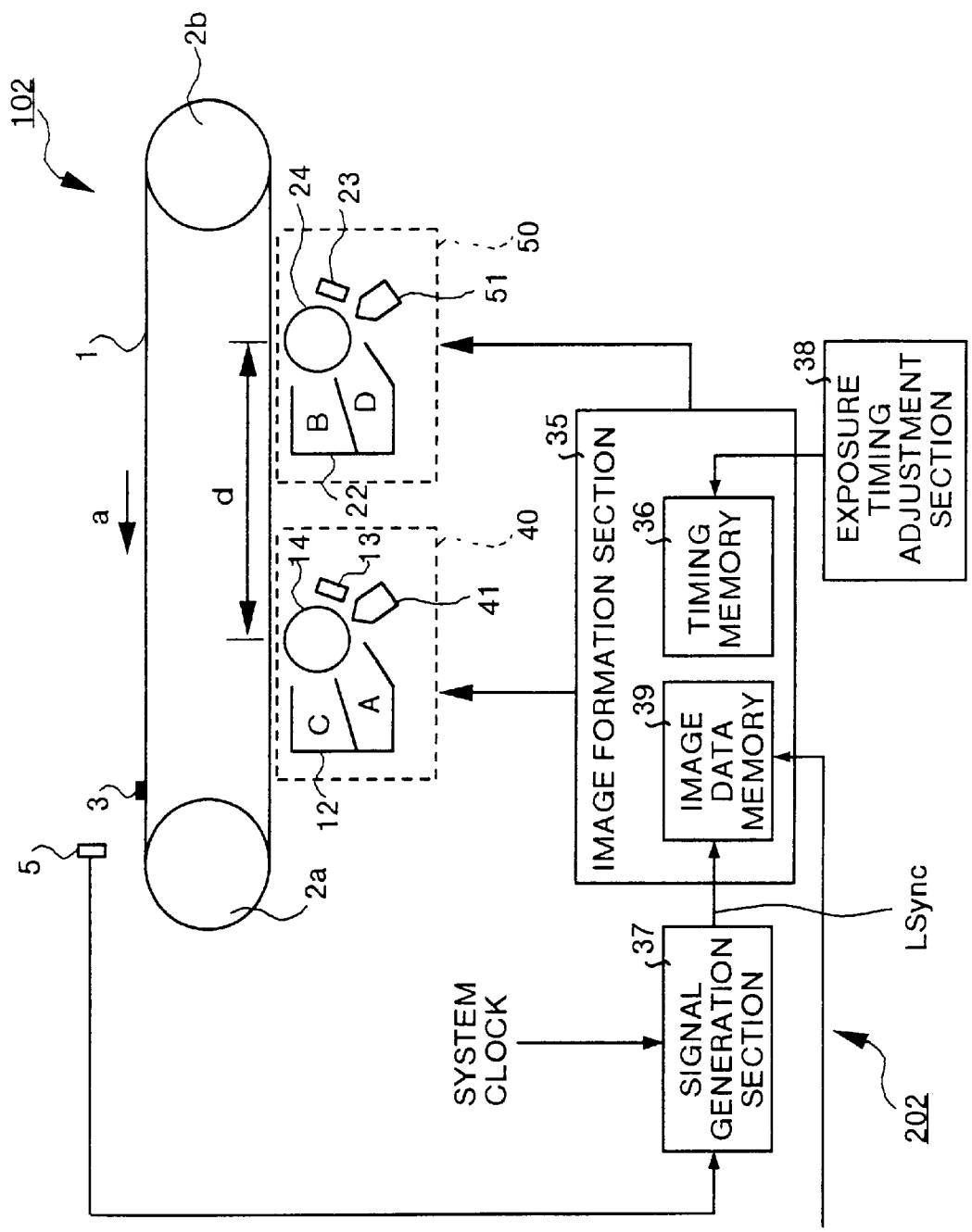
FIG. 13 is a block diagram showing an image formation apparatus according to a third embodiment of the present invention.

FIG. 13 is a view showing configuration of a printer according to the third embodiment. FIG. 14 through FIG. 17 explain the signals transacted in the printer shown in FIG. 13. The printer shown in FIG. 13 is substantially the same as that shown in FIG. 4. Therefore, same reference numerals are assigned to the same components of the printer shown in FIG. 13 as those of the printer shown in FIG. 4 and their explanation is omitted.

The printer shown in FIG. 13 largely comprises an execution section 102 which executes image formation and a control section 202 which controls the execution section 102. The execution section 102 has an intermediate transfer belt 1, and first and second image formation sections 40, 50 which are provided along a surface of the intermediate transfer belt 1.

The first image formation section 40 has, like the image formation section 10 according to the first embodiment of the present invention, a first photosensitive drum 14, and a first electrifier 13 which electrifies the first photosensitive drum 14. The first image formation section 40 further has a first LED array 41 as a light source for exposure used to write an electrostatic latent image on the first photosensitive drum 14, and a first development device 12 which develops the written electrostatic latent image as a toner image. The first development device 12 has toners for colors A and C, and forms toner images for colors A and C.

The second image formation section 50 has the same configuration as that of the first image formation section 40. Namely, the second image formation section 50 has a second photosensitive drum 24, and a second electrifier 23 which electrifies the second photosensitive drum 24. The second image formation section 50 further has a second LED array 51 as a light source for exposure used to write an electrostatic latent image on the second photosensitive drum 24, and a second development device 22 which develops the written electrostatic latent image as a toner image. The second image formation section 50 is different from the first image formation section 40 in that the second development device 22 has toners for colors B and D and forms toner images for colors B and D. The first and second image formation sections 40 and 50 are located at a distance d therebetween, and the intermediate transfer belt 1 contacts the first and second photosensitive drums 14, 24 while it runs in a direction indicated by the sign a in the figure.

The control section 202 has a signal generation section 37 which generates a synchronizing signal instructing timing for image formation to the first and second image formation sections 40 and 50, and an image formation control section 35 which controls the first and second image formation sections 40, 50 based on a synchronizing signal generated by the signal generation section 37.

The signal generation section 37 counts clock signals like the signal generation section 17 according to the first embodiment and outputs a synchronizing signal LSync. The image formation control section 35 has the same configuration as that of the image formation control section 15 according to the first embodiment in the point that it outputs an exposure signal to the first and second image formation sections 40, 50 based on the synchronizing signal LSync generated by the signal generation section 37.

In the image formation control section 35 according to the third embodiment, however, of the control programs for controlling the first and second image formation sections 40 and 50, only the program for deciding timing for output of the exposure signal is stored, for instance, in a rewritable timing memory 36 such as a RAM. The printer according to the third embodiment further has an exposure timing adjustment section 38 which can rewrite contents of the timing memory 36. This exposure timing adjustment section 38 is, for instance, an operation board integrated with an operation panel of the printer, and with the exposure timing adjustment section 38, a user can simply change timing for output of the exposure signal LEDEn to the second image formation section 50 in the timing memory 36 by operating the exposure timing adjustment section 38 according to a state of the printer.

In the third embodiment 3, the first and second LED arrays 41, 51 are employed as light sources for exposure to the first and second image formation sections 40, 50 respectively. This LED array exposes image data for one line all at once.

Because of the configuration described above, an image data memory for accumulating image data for one line is required. In the third embodiment, the image data memory 39 is incorporated in the image formation control section 35. Image data is accumulated in the image data memory 39, and is transferred line by line to the first and second image formation sections 40, 50. The synchronizing signal LSync may be initialized each time the mark 3 is detected. As a printer generally has a memory for temporally accumulating image data therein, this memory may be used as the image data memory 39.

When the image data consists of four colors, it means that each line has the image data for four colors. In the printer shown in FIG. 13, of the image data for four colors, at first image data for color A for all lines is completed by a first LED array 41 as a toner image, and the toner image is transferred to the intermediate transfer belt 1. The second LED array 51 then completes image data for color B for all lines as a toner image, which is transferred onto the toner image for color A on the intermediate transfer belt 1. Subsequently, a toner image for color C is completed by the first LED array 41, and the toner image for color C is transferred onto the toner images for colors A, B, and then a toner image for color D is completed by the second LED array 51, and the toner image for color D is transferred onto the toner images for colors A, B, C, thus a color images with four colors being formed.

Figure 14:
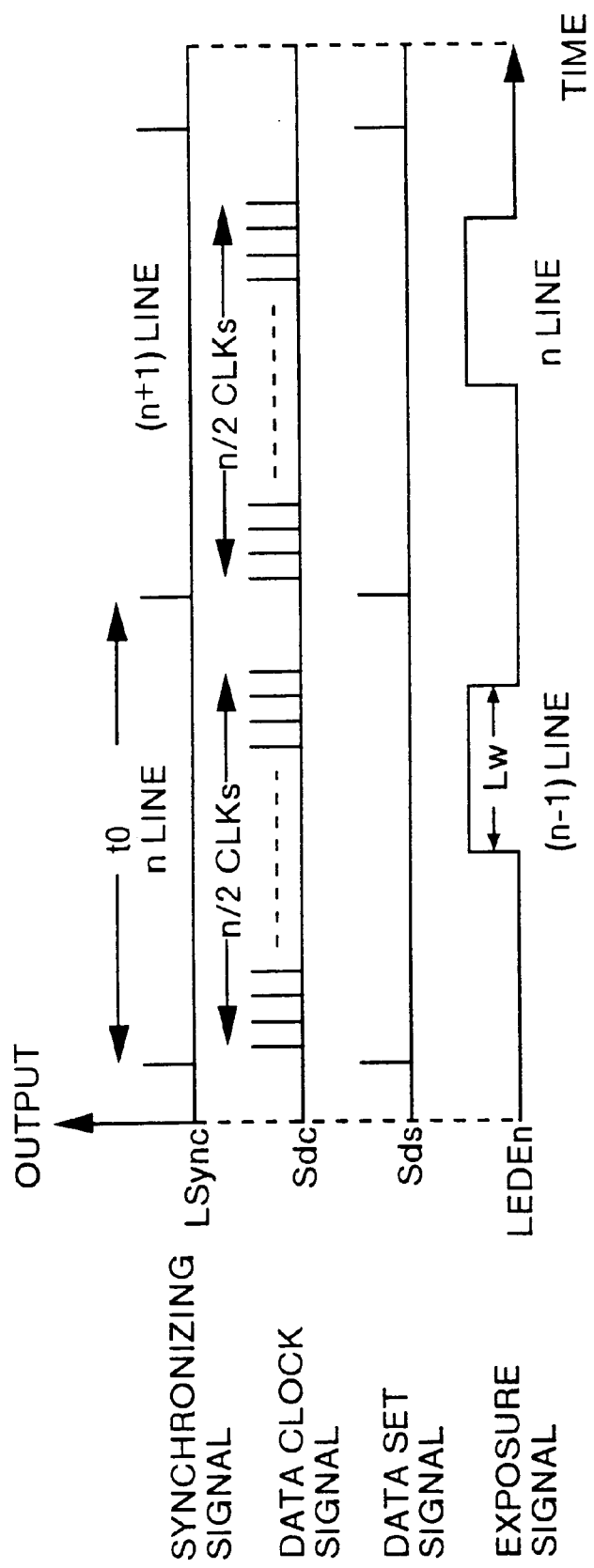
FIG. 14 is a view showing signals transmitted from or received by the image formation apparatus according to the third embodiment of the present invention.

Signal usually transacted in the printer according to the third embodiment are explained using FIG. 14. In FIG. 14 signal output is shown on the vertical axis and time is shown on the horizontal axis. In FIG. 14, the synchronizing signal LSync, data clock signal Sdc, data set signal Sds indicating that all of image data for one line has been transferred to an LED array, and exposure signal LEDEn indicating exposure timing for the first LED array 41, namely a time point when the first LED array 41 is turned ON are shown. The data clock signal Sdc is a signal indicating timing for transfer of image data from the image formation control section 35 to the first LED array 41, and is generated based on a clock signal.

The signal generation section 37 counts clock signals (not shown in FIG. 14), and outputs a synchronizing signal LSync to the image formation section 35 each time the count value reaches a specified number. The specified number used herein indicates a number of clock signals corresponding to the time t0 as shown in FIG. 14. In the example shown in FIG. 14, image data for one line is transferred to the first LED array 41 within one cycle of the synchronizing signal LSync. FIG. 14 shows a cycle in which image data for the n-th line is transferred, and a cycle in which image data for the (n+1)-th line is transferred.

Image data for the n-th line and image data for the (n+1)-th line are transferred by a minimum unit for transfer according to the order of data array in the main scan direction to a register of a head portion in the first LED array. This timing for transfer is synchronous to the data clock signal Sdc. In the third embodiment, image data for even number dots and those for odd number dots are transferred discretely, and an image for one line consisting of n dots in the main scan direction can be transferred with clocks equal to n/2. When the LED array has multiple gradations, multiple bit image data can be transferred in parallel.

The image formation control section 35 outputs a data set signal Sds to the first LED array 41. As this data set signal Sds is generated in synchronism to the synchronizing signal LSync as shown in FIG. 14. Thus, this signal can be used as a signal indicating completion of image data transfer for one line. Counting of clock signals is started when the data set signal Sds is generated, and when the count value reaches a specified number, the exposure signal LEDEn is outputted to the first LED array 41. The first LED array 41 having received the exposure signal LEDEn turns ON for a period of time corresponding to a pulse width Lw of the exposure signal LEDEn, transfers the image data to the first photosensitive drum 14. Thus, the electrostatic latent image is formed on the drum 14.

Exposure of image data for a line transferred just before is executed in the first LED array 41. Therefore, timings for exposure of image data for the (n–1)-th line and of image data for the n-th line are also shown in FIG. 14.

Figure 15:
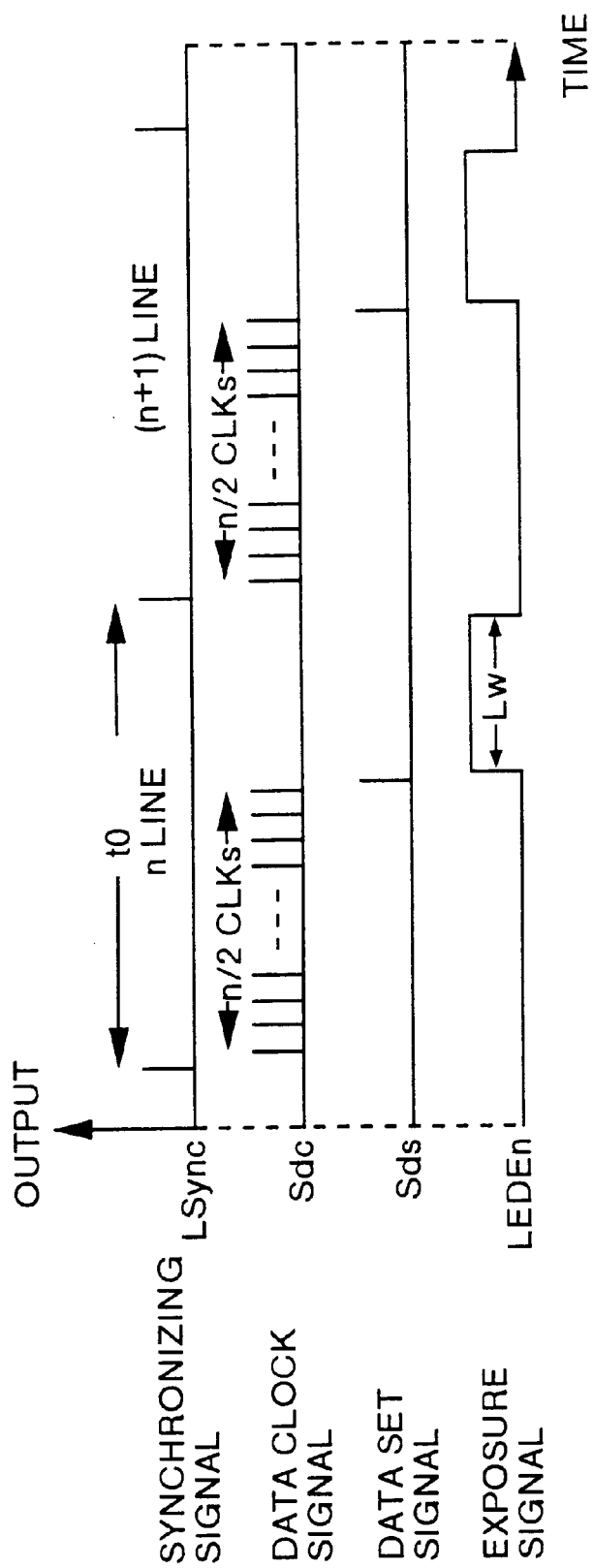
FIG. 15 is another view showing signals transmitted from or received by the image formation apparatus according to the third embodiment of the present invention.

If it is possible to have a data clock signal Sdc having a higher speed, transfer of and exposure for image data can be executed within one cycle of the synchronizing signal LSync as shown in FIG. 15.

The signal described above is outputted from the image formation control section 35 to the first LED 41. Therefore, when it is necessary to successively form a plurality of color images, the image formation control section 35 outputs the signal shown in FIG. 14 to the first LED array 41, counts clock signals corresponding to a time from a point of time when the synchronizing signal LSync shown in FIG. 14 is generated until a point of time when the transferred image is carried over the distance d, and generates and outputs the exposure signal LEDEn to the LED array as well as to the second LED array.

In the third embodiment, the exposure timing adjustment section 38 is provided. Therefore, it is possible to adjust a time from a point of time when a synchronizing signal LSync is outputted from the first LED array 41 until a point of time when an exposure signal LEDEn is outputted to the second LED array 51. With such a configuration, when a user checks the printed color image and finds that color displacement is present in the color image, the user can change the timing for output of the exposure signal LEDEn to the second image formation section 20 so that the color displacement will be eliminated.

Figure 16:
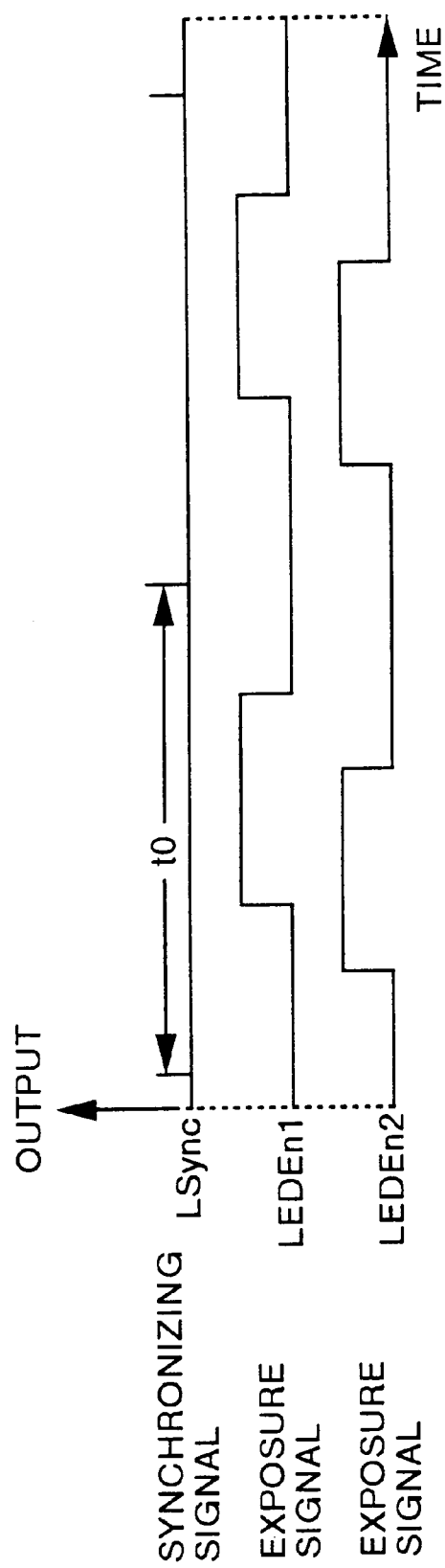
FIG. 16 is another view showing signals transmitted from or received by the image formation apparatus according to the third embodiment of the present invention.
Figure 17:
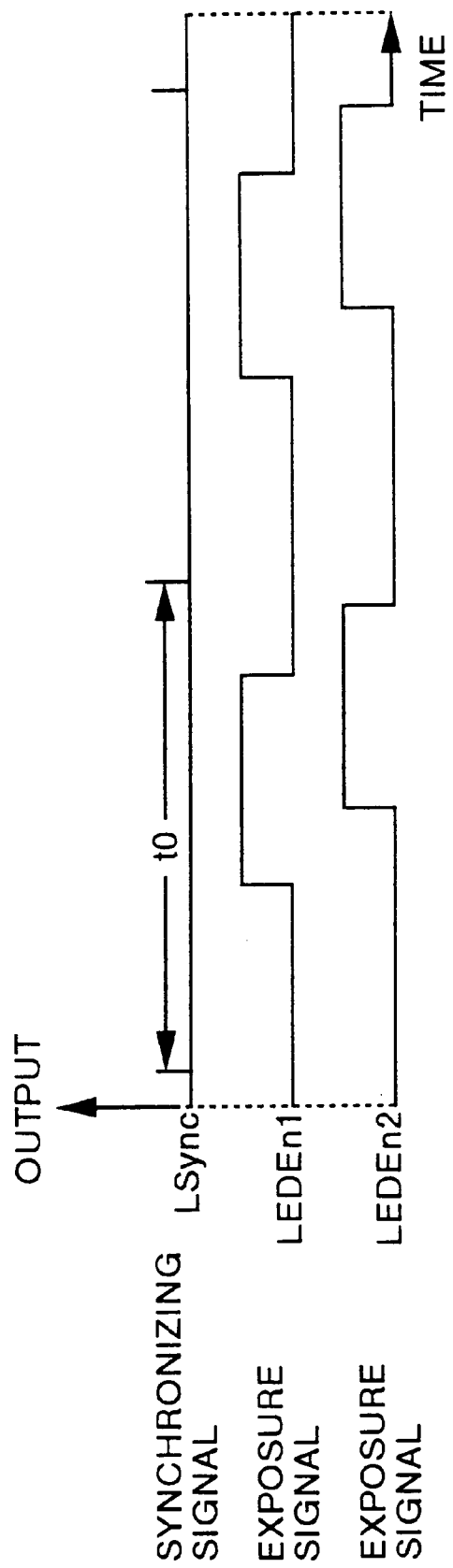
FIG. 17 is another view showing signals transmitted from or received by the image formation apparatus according to the third embodiment of the present invention.

FIG. 16 and FIG. 17 explain the operations for the adjustment of the synchronizing signal LSync. FIG. 16 shows adjustments performed when timing of image formation in the second image formation section 50 is delayed with respect to the timing at which the image is formed in the first image formation section. FIG. 17 shows adjustments performed when timing for image formation in the second image formation section 50 is earlier with respect to the timing at which the image is formed in the first image formation section 40. In FIG. 16 and FIG. 17, signal output is shown on the vertical axis and time is shown on the horizontal axis. In these figures, a synchronizing signal LSync, exposure signal LEDEn1 generated when the first image formation section 40 forms an image, exposure signal LEDEn2 generated when the second image formation section 50 forms an image are shown.

From FIG. 16, it can be understood that, when timing of image formation by the second image formation section 50 is delayed and the image formed by the second image formation section 50 is transferred behind the image formed by the first image formation section 40 in the direction of movement of the intermediate transfer belt 1, color displacement can be eliminated by making earlier the timing for output of the exposure signal LEDEn2.

It can be understood from FIG. 17 also that, when an image formed by the second image formation section 50 is transferred beyond the image formed by the first image formation section 40 in the direction of movement of the intermediate transfer belt 1, the color displacement can be eliminated by making late the timing of output of the exposure signal LEDEn2.

In the third embodiment of the present invention described above, a user can modify color displacement of a color image checking the color image formed by the printer. Therefore, modification of color displacement can be performed more accurately while checking an operating state of the printer.

When an image is formed with a bit-map font, if there is a line extending in the auxiliary scan direction, it is well known that the jaggy is generated along this line. In a fourth embodiment of the present invention, an image data memory in which image data is accumulated is additionally provided. Therefore, the timing of the image formation by the image formation section can be adjusted based on the image data accumulated in this image data memory in such a way that the jaggy is reduced. This improves the image quality.

Figure 18:
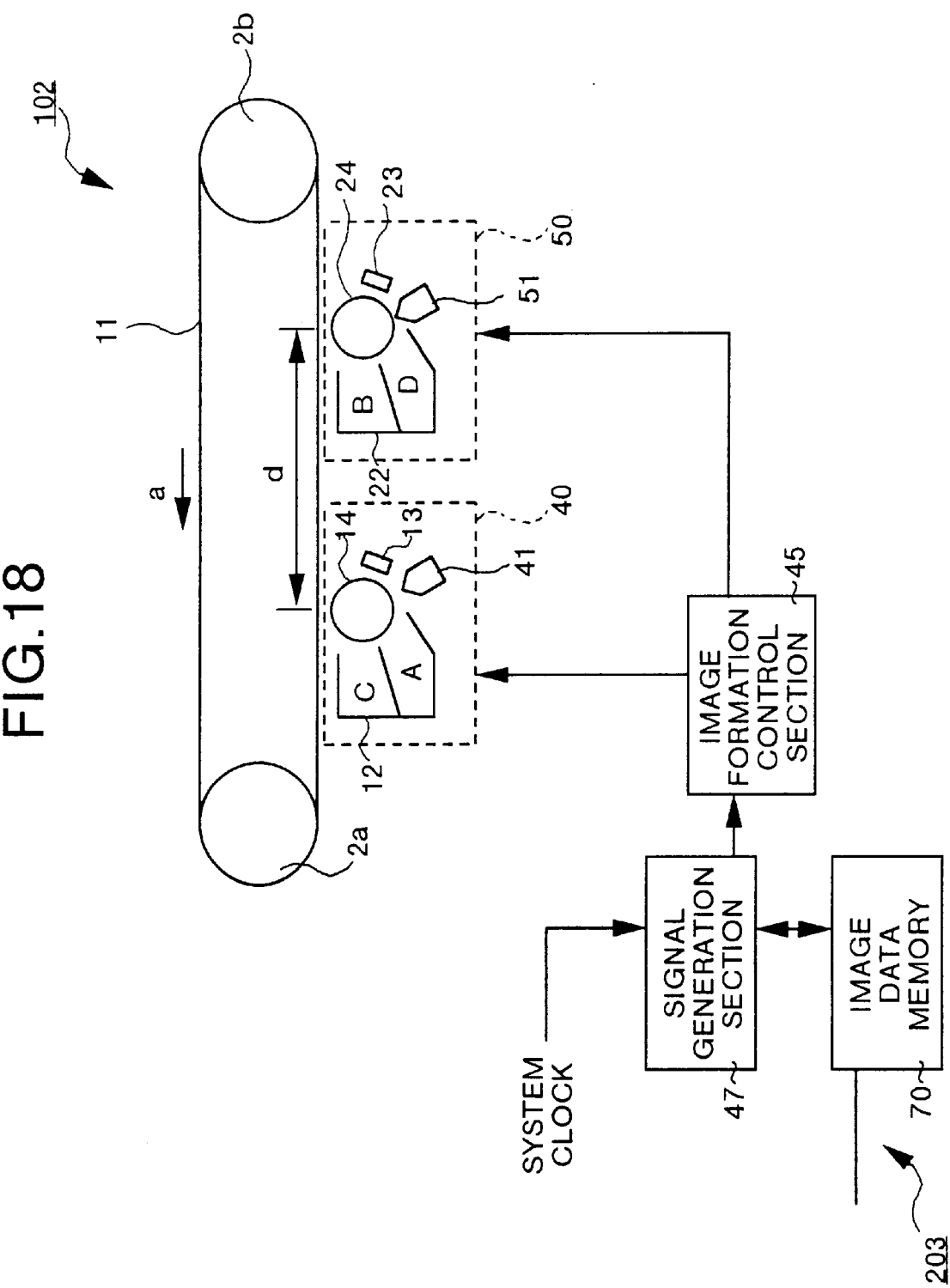
FIG. 18 is a block diagram showing an image formation apparatus according to a fourth embodiment of the present invention.
Figure 19:
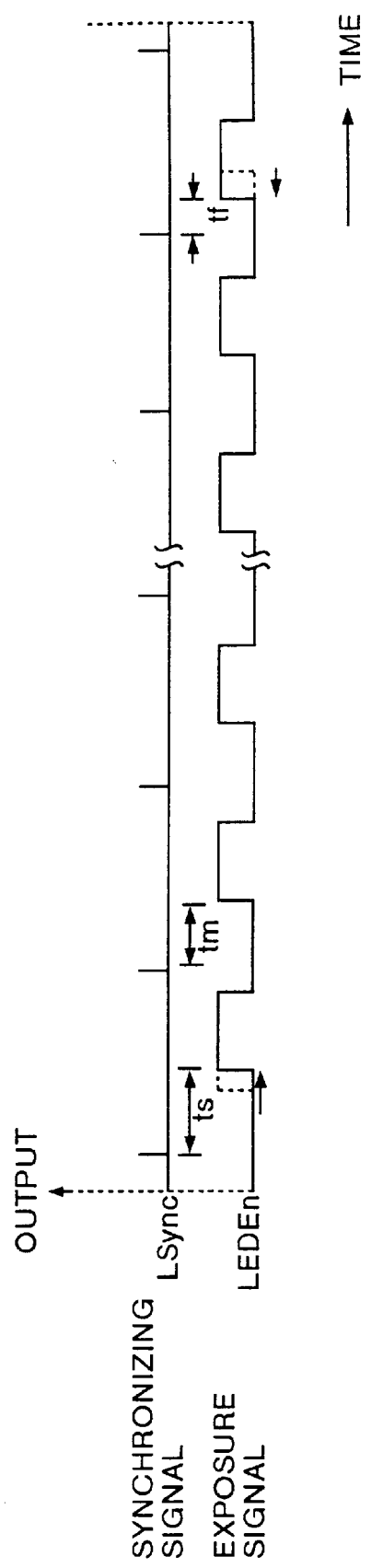
FIG. 19 is a view showing signals transmitted from or received by the image formation apparatus according to the fourth embodiment of the present invention.

FIG. 18 shows the configuration of a printer according to the fourth embodiment of the present invention. FIG. 19 explains the signals transacted to and from the printer shown in FIG. 18. The composition of the printer according to the fourth embodiment is substantially the same as that of the printer shown in FIG. 13 and described in relation to the third embodiment. Because of this similarity, the same reference numerals are assigned to the same components as those of the printer shown in FIG. 13, and their explanation is omitted.

The printer shown in FIG. 18 largely comprises the execution section 102 which executes image formation, and the control section 203 which controls the execution section 102. The execution section 102 has the intermediate transfer belt 1, and the first and second image formation sections 40, 50 each provided along a surface of the intermediate transfer belt 1.

The control section 203 has a signal generation section 47 which generates a synchronizing signal LSync instructing timing for image formation to the first and second image formation sections 40, 50, and an image formation control section 45 which controls the first and second image formation sections 40, 50 based on the synchronizing signal LSync generated by the signal generation section 47.

The signal generation section 47 according to the fourth embodiment of the present invention is connected to an image data memory 70 in which image data is accumulated, and recognizes image data accumulated in the image data memory 70. When the image data includes a line extending in the auxiliary scan direction, namely when the same data successively appears in the auxiliary scan direction, timing of exposure is changed at the beginning and end of the successive data. The printer generally has a memory in which image data is accumulated, and such a memory may be utilized as the image data memory 70.

This process is described more specifically with reference to FIG. 19. In FIG. 19, signal output is shown on the vertical axis and time is shown on the horizontal axis. In this figure a synchronizing signal Lsync and an exposure signal LEDEn are shown. tm indicates a time from a point of time when a synchronizing signal LSync is generated until a point of time when an ordinary exposure signal LEDEn is outputted at the starting edge position. ts indicates a time from a point of time when the synchronizing signal LSync is generated until a point of time when the synchronizing signal LSync is generated at the ending edge position. tf indicates a time from a point of time when the synchronizing signal LSync is generated until a point of time when the exposure signal LEDEn is outputted at the ending edge position. There exists a relation between tf, tm, ts such that tf<tm<ts.

Namely, the signal generation section 47 outputs the exposure signal LEDEn later at a stating edge position of successive data as compared to the timing at other positions, and outputs the exposure signal LEDEn earlier at an ending edge position as compared to the timing at other positions. Because of this control, bits constituting an image are located nearer to each other along a line extending in the auxiliary scan direction as compared to those in other sections, so that a frequency of generation of jaggy is reduced.

In the fourth embodiment described above, even if an image data is outputted with a bit-map font, generation of the jaggy along the outline of the outputted image can be suppressed and hence an image having a higher quality can be formed. In other words, the so-called RET (Resolution Enhancement Technology) effect can be obtained.

As described above, the present invention provides the following advantages. The image formation apparatus and method thereof according to the present invention initializes a timing instruction signal which instructs the timing of an image formation to the image forming unit which can form an image with at least two colors each time a mark indicating a specified position on the intermediate transfer belt is detected. Because of this feature, the timing instruction signal is counted anew each time the specified position on the intermediate transfer belt passes under the mark detection unit. Therefore, even if the length of the intermediate transfer belt changes from the length at the time of manufacture, influence of the change over timing of image formation can be suppressed, displacement of the image transfer position can be prevented, and a higher quality image can be formed.

The image formation apparatus and method thereof according to the present invention has a plurality of timing instruction signal generation units and a plurality of marks on the intermediate transfer belt. When it is necessary to successively form a plurality of images, each of the plurality of images is correlated to any of the timing instruction generation units, and each image is formed based on a timing instruction signal generated by the correlated timing instruction signal generation unit. Because of this feature, even when color images are formed successively, influence of the change in the length of the intermediate transfer belt over timing of image formation can be suppressed, and a high quality image with little displacement of a transfer position can be formed at a high speed.

In the image formation apparatus and method thereof according to the present invention, the image formation timing instruction unit, which instructs timing of image formation to a plurality of image formation units each having a non-scan type of light source for exposure, can adjust the timing of the image formation according to the necessity. When the formed color image shows color displacement, a user can set optimal timing of image formation adjusting the color displacement. Therefore, a user can set conditions for image formation according to an operating sate of the image formation apparatus.

In the image formation apparatus and method thereof according to the present invention, the image formation timing instruction unit can reduce positional displacement between transferred images formed by a plurality of image formation sections by adjusting the timing, at which other image formations form images, according to timing of image formation by at least one image formation unit of a plurality of image formation units.

The image formation apparatus and method thereof according to the present invention has the timing adjustment unit which adjusts timing of image formation by an image formation unit, so that a user can easily adjust timing of image formation. Because of this feature, convenience in use of the image formation apparatus is improved.

The image formation apparatus and method thereof according to the present invention further comprises the image data accumulation unit which accumulates image data therein, and the image formation unit adjusts timing of image formation based on the image data accumulated in the image data accumulation unit. When an image is formed with a bit-map font, the RET effect for reducing jaggy in a formed image can be obtained.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image formation apparatus comprising:
    an intermediate transfer body having a mark on a specific position on a surface thereof;
    a mark detection unit configured to detect said mark on said intermediate transfer body;
    an image formation unit configured to form an image with at least two colors on said intermediate transfer body; and
    a timing specification signal generator configured to generate a timing specification signal as a signal specifying a timing for image formation and to output the timing specification signal to said image formation unit,
    wherein the timing specification signal is initialized each time said mark detection unit detects said mark, and wherein the mark detection unit is disposed upstream from the image formation unit such that the mark is detected prior to the image formation unit forming a first color of the at least two colors on the intermediate transfer body.

2. The image formation apparatus according to claim 1, wherein the timing specification signal generator comprises a plurality of timing specification signal generators and the mark comprises a plurality of marks utilized to initialize a timing specification signal of a respective timing signal generator of said plurality of timing specification signal generators, and wherein when a plurality of images are to be formed successively, said image formation unit correlates each of the plurality of images to any one of said plurality of timing specification signal generators, and forms each image based on the timing specification signal generated by the respective timing specification signal generator.

3. An image formation apparatus comprising:

an intermediate transfer body;

a plurality of image formation units each having a non-scan type of exposure light source; and an image formation timing specification unit configured to specify a timing for image formation to each of said plurality of image formation units, wherein said image formation timing specification unit adjusts the timing for the image formation according to necessity, and wherein said image formation timing specification unit has a user manually-operated timing adjustment unit configured to allow a user to adjust the timing for the image formation in each of said plurality of image formation units.

4. The image formation apparatus according to claim 3, wherein said image formation timing specification unit adjusts a timing for image formation by a respective image formation unit based on a timing of image formation by at least another one of said pluity of image formation units.

5. The image formation apparatus according to claim 3, further comprising:

an image data accumulation unit configured to accumulate image data for images to be formed by said plurality of image formation units, wherein said image fornation timing specification unit adjusts a timing for image formation by a respective image formation unit according to the image data accumulated in said image data accumulation unit.

6. An image formation apparatus comprising:

an intermediate transfer body having a mark on a specific position on a surface thereof;

a mark detection means for detecting said mark on said intermediate transfer body;

an image formation means for forming an image with at least two colors on said intermediate transfer body; and a timing specification signal generation means for generating a timing specification signal as a signal specifying a timing for image formation and for outputting the timing specification signal to said image formation means, wherein the timing specification signal is initialized each time said mark detection means detects said mark, and wherein the mark detection means is disposed upstream from the image formation means such that the mark is detected prior to the image formation means forming a first color of the at least two colors on the intermediate transfer body.

7. The image formation apparatus according to claim 6, wherein the timing specification signal generation means comprises a plurality of timing specification signal generation means, and the mark comprises a plurality of marks utilized to initialize a timing specification signal of a respective timing specification signal generator means of said plurality of timing specification signal generation means, and wherein when a plurality of images are to be formed successively, said image formation means correlates each of the plurality of images to any one of said plurality of timing specification signal generation means, and forms each image based on the timing specification signal generated by the respective timing specification signal generation means.

8. An image formation apparatus comprising:

an intermediate transfer body;

a plurality of image formation means each having a non-scan type of exposure light source; and an image formation timing specification means for specifying a timing for image formation to each of said plurality of image formation means, wherein said image formation timing specification means adjusts the timing for the image formation according to necessity, wherein said image formation timing specification means has a user-operated timing adjustment means for allowing a user to adjust the timing for the image formation in each of said plurality image formation means.

9. The image formation apparatus according to claim 8, wherein said image formation timing specification means adjusts a timing for image formation by a respective image formation means based on a timing of image formation by at least another one of said plurality of image formation means.

10. The image formation apparatus according to claim 8, further comprising:

an image data accumulation means for accumulating image data for images to be formed by said image formation means.

wherein said image formation timing specification means adjusts a timing for image formation by a respective image formation means according to the image data accumulated in said image data accumulation means.

11. An image formation method comprising the steps of:

detecting a mark on an intermediate transfer body;

forming an image with at least two colors on said intermediate transfer body;

generating a timing specification signal as a signal specifying a timing for image formation; and outputting the timing specification signal to said image formation step, wherein the timing specification signal is initialized each time said mark detection step detects said mark, and wherein the mark is detected upstream and prior to the image forming step forming a first color of the at least two colors on the intermediate transfer body.

* * * * *